United States Patent
Bartolucci et al.

(10) Patent No.: US 12,445,930 B2
(45) Date of Patent: Oct. 14, 2025

(54) SYSTEMS AND METHODS FOR PROPAGATING DATA PACKETS IN A NETWORK OF NODES

(71) Applicant: nChain Licensing AG, Zug (CH)

(72) Inventors: Silvia Bartolucci, London (GB); Simone Madeo, London (GB)

(73) Assignee: NCHAIN LICENSING AG, Zug (CH)

( * ) Notice: Subject to any disclaimer, the term of this patent is extended or adjusted under 35 U.S.C. 154(b) by 0 days.

(21) Appl. No.: 18/433,315

(22) Filed: Feb. 5, 2024

(65) Prior Publication Data
US 2024/0251324 A1    Jul. 25, 2024

Related U.S. Application Data

(63) Continuation of application No. 17/982,488, filed on Nov. 7, 2022, now Pat. No. 11,937,162, which is a continuation of application No. 17/055,448, filed as application No. PCT/IB2019/053826 on May 9, 2019, now Pat. No. 11,496,945.

(30) Foreign Application Priority Data

May 15, 2018 (GB) ..................... 1807835

(51) Int. Cl.
H04W 40/02 (2009.01)
H04W 24/02 (2009.01)

(52) U.S. Cl.
CPC ........... *H04W 40/02* (2013.01); *H04W 24/02* (2013.01)

(58) Field of Classification Search
None
See application file for complete search history.

(56) References Cited

U.S. PATENT DOCUMENTS 11,245,757 B2 *   2/2022   Bartolucci ............ H04L 67/104
11,489,751 B2 *   11/2022  Bartolucci ............ H04L 9/3297
11,496,945 B2    11/2022  Bartolucci
(Continued)

FOREIGN PATENT DOCUMENTS

EP    3753220 A1    12/2020
JP    2002059779 A   2/2002
(Continued)

OTHER PUBLICATIONS

Anonymous, "Bips/bip-dandelion.mediawiki," GitHub, retrieved from https://github.com/dandelion-org/bips/blob/eaacc-f89f3674d64a5ca6f2d433660a7667bee80/bip-dandelion.mediawiki, May 9, 2018, 9 pages.

Anonymous, "Bips/bip-dandelion.mediawiki," GitHub, retrieved from https://github.com/dandelion-org/bips/blob/master/bip-dandelion.mediawiki#Implementation, Jun. 25, 2018, 11 pages.

(Continued)

*Primary Examiner* — Brian S Roberts
(74) *Attorney, Agent, or Firm* — Tarolli, Sundheim, Covell &Tummino LLP

(57) ABSTRACT

Techniques are presented for a method of propagating data packets in a network of nodes. The method includes: generating at least one data packet of a first type; collecting a set of first data packets of the first type during a first time period the set including at least one data packet received from one or more other nodes in the network; arbitrarily selecting a subset of entry nodes to the first node to which a subset of the collected and generated data packets will be forwarded to; and transmitting the data packets to the subset of arbitrarily selected entry nodes.

11 Claims, 14 Drawing Sheets

(56) References Cited

U.S. PATENT DOCUMENTS

| | | | |
|---|---|---|---|
| 11,743,328 B2* | 8/2023 | Bartolucci | H04L 67/108 |
| | | | 370/254 |
| 2003/0128687 A1* | 7/2003 | Worfolk | H04L 45/123 |
| | | | 370/351 |
| 2007/0150928 A1* | 6/2007 | Hottinen | H04B 7/155 |
| | | | 725/127 |
| 2011/0116397 A1 | 5/2011 | Imanaka | |
| 2013/0182625 A1 | 7/2013 | Kuehnel et al. | |
| 2015/0098443 A1 | 4/2015 | Ankaiah et al. | |
| 2019/0082007 A1* | 3/2019 | Klarman | H04L 63/123 |
| 2020/0389519 A1* | 12/2020 | Bartolucci | H04L 9/3236 |

FOREIGN PATENT DOCUMENTS

| | | |
|---|---|---|
| JP | 2006228201 A | 8/2006 |
| JP | 2012129857 A | 7/2012 |

OTHER PUBLICATIONS

Antonopoulos, "Mastering Bitcoin—Unlocking Digital Cryptocurrencies," O'Reilly Media, Inc., Dec. 20, 2014, 282 pages.

Bojja et al., "Dandelion: Redesigning the Bitcoin Network for Anonymity," Jan. 16, 2017, 19 pages.

Diaz et al., "Towards Measuring Anonymity," Springer International Publishing, Jan. 1, 2003, 15 pages.

Fanti et al., "Spy vs. Spy: Rumor Source Obfuscation," Apr. 26, 2015, 14 pages.

International Search Report and Written Opinion for Application No. PCT/IB2019/053826, mailed Sep. 16, 2019, filed May 9, 2019, 10 pages.

Nakamoto, "Bitcoin: A Peer-to-Peer Electronic Cash System," Bitcoin, Oct. 31, 2008, https://bitcoin.org/bitcoin.pdf, 9 pages.

Satoshi et al., "Connection Limits," Bitcoin Forum, Aug. 9, 2010, https://bitcointalk.org/index.php?topic=741.0;prev_next=prev, 2 pages.

UK IPO Search Report mailed Oct. 29, 2018, Patent Application No. GB1807835.2, 3 pages.

* cited by examiner

SYSTEMS AND METHODS FOR PROPAGATING DATA PACKETS IN A NETWORK OF NODES

CROSS REFERENCE TO RELATED APPLICATIONS

This application is a continuation of U.S. patent application Ser. No. 17/982,488, filed Nov. 7, 2022, entitled "SYSTEMS AND METHODS FOR PROPAGATING DATA PACKETS IN A NETWORK OF NODES," which is a continuation of U.S. patent application Ser. No. 17/055,448, filed Nov. 13, 2020, now U.S. Pat. No. 11,496,945, entitled "SYSTEMS AND METHODS FOR PROPAGATING DATA PACKETS IN A NETWORK OF NODES," which is a 371 Nationalization of International Patent Application No. PCT/IB2019/053826, filed May 9, 2019, which claims priority to United Kingdom Patent Application No. 1807835.2, filed May 15, 2018, the disclosures of which are incorporated herein by reference in their entirety.

TECHNICAL FIELD

This invention relates generally to computer networks, and more particularly to methods and devices to propagate data in a network of nodes, electronic communications and networking technologies. It is particularly suited for use in relation to blockchain technologies. In particular, it relates to secure transmission of data, and for the reduction of potentially malicious events by third parties, i.e., attacks.

BACKGROUND

In this document we use the term 'blockchain' to include all forms of electronic, computer-based, distributed ledgers. These include consensus-based blockchain and transaction-chain technologies, permissioned and un-permissioned ledgers, shared ledgers and variations thereof. The most widely known application of blockchain technology is the Bitcoin ledger, although other blockchain implementations have been proposed and developed. While Bitcoin may be referred to herein for the purpose of convenience and illustration, it should be noted that the invention is not limited to use with the Bitcoin blockchain and alternative blockchain implementations and protocols fall within the scope of the present invention. The term "user" may refer herein to a human or a processor-based resource. The term "Bitcoin" is intended to include all versions and variations of protocol/implementation/platform which derive from the (original) Bitcoin protocol/implementation/platform.

A blockchain is a peer-to-peer, electronic ledger which is implemented as a computer-based decentralised, distributed system made up of blocks which in turn are made up of transactions. Each transaction is a data structure that encodes the transfer of control of a digital asset between participants in the blockchain system, and includes at least one input and at least one output. Each block contains a hash of the previous block to that blocks become chained together to create a permanent, unalterable record of all transactions which have been written to the blockchain since its inception. Transactions contain small programs known as scripts embedded into their inputs and outputs, which specify how and by whom the outputs of the transactions can be accessed. On the Bitcoin platform, these scripts are written using a stack-based scripting language.

In order for a transaction to be written to the blockchain, it must be "validated". Network nodes (miners) perform work to ensure that each transaction is valid, with invalid transactions rejected from the network. Software clients installed on the nodes perform this validation work on an unspent transaction (UTXO) by executing its locking and unlocking scripts. If execution of the locking and unlocking scripts evaluate to TRUE, the transaction is valid and the transaction is written to the blockchain. Thus, in order for a transaction to be written to the blockchain, it must be i) validated by the first node that receives the transaction—if the transaction is validated, the node relays it to the other nodes in the network; and ii) added to a new block built by a miner; and iii) mined, i.e., added to the public ledger of past transactions.

Although blockchain technology is most widely known for the use of cryptocurrency implementation, digital entrepreneurs have begun exploring the use of both the cryptographic security system Bitcoin is based on and the data that can be stored on the Blockchain to implement new systems. It would be highly advantageous if the blockchain could be used for automated tasks and processes which are not limited to the realm of cryptocurrency. Such solutions would be able to harness the benefits of the blockchain (e.g., a permanent, tamper proof records of events, distributed processing etc) while being more versatile in their applications.

One of the perceived advantages of blockchain technology, such as Bitcoin, is the anonymity of transactions. Personal details of a Bitcoin user are not formally and explicitly attached to Bitcoin addresses, and the Bitcoin ledger of the blockchain only contains public address information. However, since a blockchain is structured as a distributed, peer-to-peer network operating on top of the Internet, anonymity of transactions may be compromised by attacks that use Internet Protocol (IP) address information to link users with network activity. By way of illustration, de-anonymization attacks, such as IP traffic analysis, conducted on a blockchain-based network may enable interested third-parties to monitor transactions submitted by users on the network and use publicly available information to link the transactions to their sources, for example, by linking user's public keys with their IP addresses.

Traffic analysis is particularly problematic for a blockchain-based network, which relies on propagation of transactions by and between network nodes. Each node in the network that receives a transaction validates the transaction and subsequently sends it to peer nodes. In the Bitcoin protocol, a node will send an "INV" message containing a list of transactions to a peer node and receive a "GETDATA" response message selecting some subset of the transactions advertised in the "INV" message. The node then sends the requested transactions to the peer node. This process is carried out with respect to each peer node to which the node is connected. An attacker may intercept and analyse data that is transmitted when transactions are propagated in the network, and ultimately gain information which can be used to link sources and destinations of transactions.

It would be desirable to provide techniques for propagating transactions in blockchain-based networks which can reduce the likelihood of compromise of network anonymity through traffic analysis or other types of de-anonymization attacks. More generally, it would be desirable to provide techniques for relaying data between nodes of a peer-to-peer network to reduce the vulnerability to de-anonymization attacks.

Such a solution has now been devised.

Thus, in accordance with the present invention there are provided methods and devices as defined in the appended claims.

SUMMARY

The invention may provide a computer-implemented method of propagating data packets in a network of nodes. Each node in the network may have one or more connections to other nodes. The method may include collecting a set of first data packets during a first time period, the set including at least one data packet received from one or more first nodes in the network; generating a first mapping that assigns the first data packets of the set for relay to one or more neighbouring nodes connected to the node; computing a decorrelation metric value for the first mapping; and determining whether the decorrelation metric value for the first mapping satisfies a first condition. In response to determining that the decorrelation metric value for the first mapping does not satisfy the first condition, the method may further include generating a second mapping that assigns the first data packets of the set for relay to one or more neighbouring nodes connected to the node, the second mapping defining assignments that are different from those of the first mapping; computing a decorrelation metric value for the second mapping; and in response to determining that the decorrelation metric value for the second mapping satisfies the first condition, transmitting the first data packets of the set to neighbouring nodes according to the second mapping.

In some implementations, the first mapping may indicate an expected time of relay of each first data packet of the set to neighbouring nodes, and generating the first mapping may include determining at least one of: a first sub-mapping which assigns any two data packets having a same source for relay to different subsets of the one or more neighbouring nodes; and a second sub-mapping which assigns different expected times of relay to any two data packets that are generated at the node or received by the node from the one or more first nodes in a same time interval.

In some implementations, generating the second mapping may include, for at least one of the first data packets of the set: determining a first set of neighbouring nodes to which the at least one of the first data packets is assigned for relay by the first mapping; selecting a second set of neighbouring nodes that is different from the first set, the second set having a same cardinality as the first set; and assigning the at least one of the first data packets for relay to the second set of neighbouring nodes.

In some implementations, the method may further include, for any two different first data packets of the set: obtaining a measure of similarity between sets of neighbours to which the two first data packets are respectively assigned by the first mapping; and in response to determining that the measure of similarity satisfies a second condition, generating a third mapping of the first data packets of the set to the one or more neighbouring nodes.

In some implementations, the sets of neighbours may be representable as vectors and the measure of similarity includes cosine similarity between vector representations of the sets of neighbours.

In some implementations, determining that the measure of similarity satisfies the second condition may include determining that the cosine similarity falls outside of a predetermined range of values.

In some implementations, the measure of similarity between the sets of neighbours may be obtained prior to computing the decorrelation metric value for the first mapping.

In some implementations, determining whether the first mapping satisfies the first condition may include: computing a difference between the decorrelation metric value, $S(R, n)$, for the first mapping and a first decorrelation metric value, $S^{nc}(R, n)$, the decorrelation metric value for the first mapping being computed based on a total number of first data packets collected during the first time period and numbers of first data packets assigned to respective ones of the one or more neighbouring nodes by the first mapping; and comparing the computed difference to a predefined threshold difference.

In some implementations, the decorrelation metric value for the first mapping may be computed as $$S(R, n) = -\sum_{i=1}^{n} \frac{c_i}{R} \ln \frac{c_i}{R}$$

where the $c_i$'s represent number of first data packets that are assigned to the respective neighbouring nodes by the first mapping, n represents a total number of the one or more neighbouring nodes, and R represents a total number of first data packets collected during the first time period.

In some implementations, the first decorrelation metric value may be computed as $$S^{nc}(R, n) =$$

$$-\frac{1}{R}\sum_{i=1}^{R_n}\left(\frac{R-R_n}{n}+1\right)\ln\left[\frac{\frac{R-R_n}{n}+1}{R}\right] - \frac{1}{R}\sum_{i=R_n+1}^{n}\left(\frac{R-R_n}{n}\right)\ln\left[\frac{\frac{R-R_n}{n}}{R}\right],$$

$$R_n = R \bmod n$$

where n represents a total number of the one or more neighbouring nodes, and R represents a total number of first data packets collected during the first time period.

In some implementations, the method may further include storing, in a database: a count of iterations of generating new mappings of the first data packets of the set for relay to the one or more neighbouring nodes; a current decorrelation metric value associated with a lowest computed difference from the first decorrelation metric value; and a current mapping associated with the current decorrelation metric value.

In some implementations, the method may further include determining whether the count of iterations is equal to a predefined number; and in response to determining that the count of iterations is equal to the predefined number, transmitting the first data packets of the set to neighbouring nodes according to the current mapping.

In some implementations, the method may further include, in response to determining that the decorrelation metric value for the first mapping satisfies the first condition, transmitting the first data packets of the set to neighbouring nodes according to the first mapping.

The invention may provide a computer-implemented system for carrying out a method as defined above or elsewhere herein.

The invention may provide a non-transitory processor-readable medium storing processor-executable instructions, where the processor-executable instructions, when executed by a processor, cause the processor to carry out a method as defined above or elsewhere herein.

In many of the example implementations described herein, specific reference is made to blockchain transactions; however, it will be appreciated that the methods and devices described herein may be implemented and applied in connection with non-blockchain transactions propagation. More generally, the methods and devices described in the present disclosure may be suitable for use in propagating various different types of data among the nodes of a peer-to-peer network.

BRIEF DESCRIPTION OF DRAWINGS

These and other aspects of the present invention will be apparent from and elucidated with reference to, the embodiment described herein. An embodiment of the present invention will now be described, by way of example only, and with reference to the accompany drawings, in which:

FIGS. 15A-15C illustrate an example algorithm for generating an assignment of relays to peer nodes.

DETAILED DESCRIPTION

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

Figure 1:
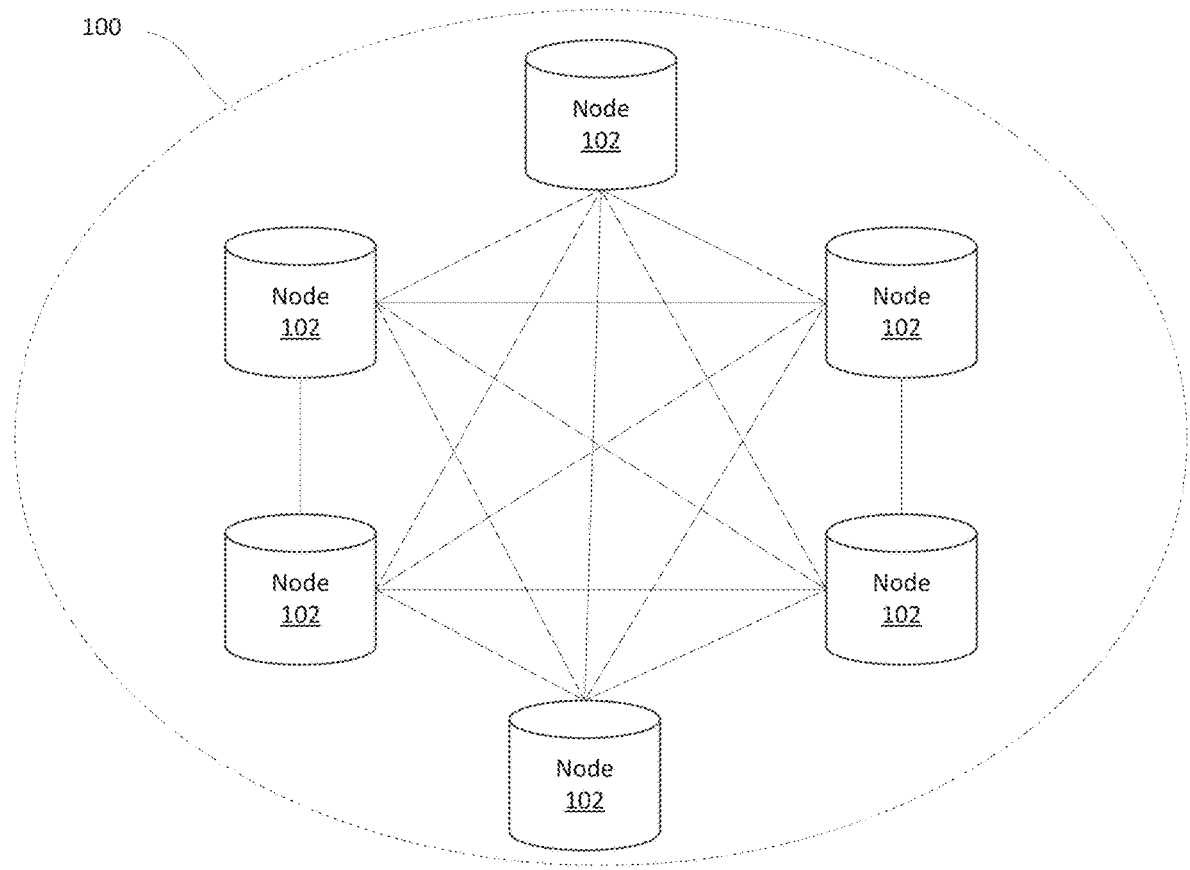
FIG. 1 illustrates an example network associated with a blockchain.

Reference will first be made to FIG. 1 which illustrates, in block diagram form, an example network associated with a blockchain, which may be referred to herein as a blockchain network 100. The blockchain network 100 is a peer-to-peer open membership network which may be joined by anyone, without invitation or without consent from other members. Distributed electronic devices running an instance of the blockchain protocol under which the blockchain network 100 operates may participate in the blockchain network 100. Such distributed electronic devices may be referred to as nodes 102. The blockchain protocol may be a Bitcoin protocol, or other cryptocurrency, for example.

The electronic devices that run the blockchain protocol and that form the nodes 102 of the blockchain network 100 may be of various types including, for example, computers such as desktop computers, laptop computers, tablet computers, servers, mobile devices such as smartphones, wearable computers such as smart watches or other electronic devices.

Nodes 102 of the blockchain network 100 are coupled to one another using suitable communication technologies which may include wired and wireless communication technologies. In many cases, the blockchain network 100 is implemented at least partly over the Internet, and some of the nodes 102 may be located in geographically dispersed locations.

Nodes 102 maintain a global ledger of all transactions on the blockchain, grouped into blocks, each of which contains a hash of the previous block in the chain. The global ledger is a distributed ledger and each node 102 may store a complete copy or a partial copy of the global ledger. Transactions by a node 102 affecting the global ledger are verified by other nodes 102 so that the validity of the global ledger is maintained. The details of implementing and operating a blockchain network, such as one using the Bitcoin protocol, will be appreciated by those ordinarily skilled in the art.

Each transaction typically has one or more inputs and one or more outputs. Scripts embedded into the inputs and outputs specify how and by whom the outputs of the transactions can be accessed. The output of a transaction may be an address to which value is transferred as a result of the transaction. That value is then associated with that output address as an unspent transaction output (UTXO). A subsequent transaction may then reference that address as an input in order to spend or disperse that value.

Nodes 102 can fulfil numerous different functions, from network routing to wallet services, to maintain a robust and secure decentralized public ledger. "Full nodes" contain a complete and up-to-date copy of the blockchain, and can therefore verify any transactions (spent or unspent) on the public ledger. "Lightweight nodes" (or SPV) maintain a subset of the blockchain and can verify transactions using a "simplified payment verification" technique. Lightweight nodes only download the headers of blocks, and not the transactions within each block. These nodes therefore rely on peers to verify their transactions. "Mining nodes", which can be full or lightweight nodes, are responsible for validating transactions and creating new blocks on the blockchain. "Wallet nodes", which are typically lightweight nodes, handle wallet services of users. Nodes 102 communicate with each other using a connection-oriented protocol, such as TCP/IP (Transmission Control Protocol).

When a node wishes to send a transaction to a peer, an "INVENTORY" message is sent to the peer, transmitting one or more inventory objects that is known to the transmitting node. If the peer replies with a "GETDATA" message, i.e., a full transaction request, the transaction is sent using a "TRANSACTION" message. The node receiving the transaction forwards it in the same manner—given that it is a valid transaction—to its peers.

Figure 2:
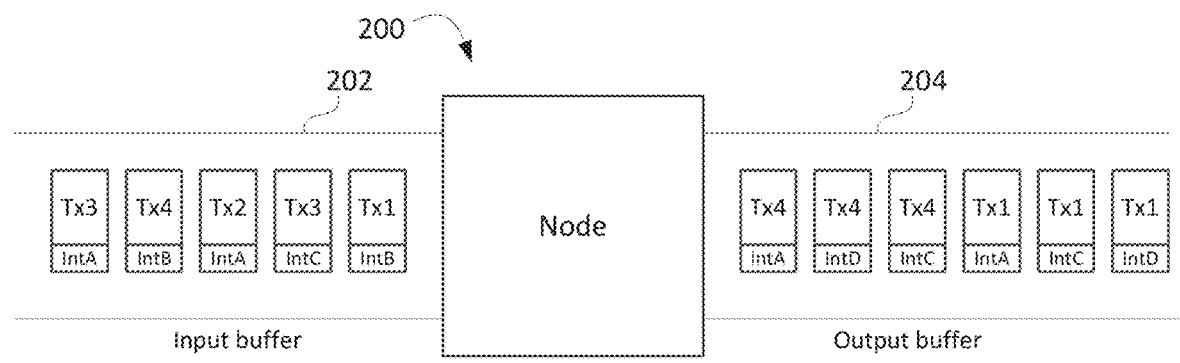
FIG. 2 diagrammatically shows an example blockchain node with an input buffer and an output buffer.

Reference is now made to FIG. 2, which diagrammatically shows an example node 200 with an input buffer 202 and an output buffer 204. The example node 200 has network interfaces with multiple peer nodes, referenced as intA, intB, intC, intD, etc. The input buffer 202 shows incoming transactions from the various peer nodes, and the output buffer 204 shows output network packets, corresponding to transactions, for transmission to peer nodes over the respective interfaces. Network packets are serially sent and received at an application-level according to the primitives provided by the operating system of the node 200. Assuming that a transaction x fits in a single Ethernet/IP packet, its transmission to m peers requires the buffering of m different output network packets. Both input and output network packets, along with other information, will contain a serialized transaction and a logical interface ID representing the TCP/IP connection to the sending/receiving peer.

Once a Bitcoin transaction is generated, the source node broadcasts the transaction message over the network. Generally, when a client generates a transaction, it is put in the output buffer 204. The transaction may or may not be forwarded immediately to the peers. In current implementations of the Bitcoin network, transactions are propagated by a mechanism known as "diffusion propagation", whereby each transaction source transmits the transaction to its neighbours with an independent, exponential delay. The delays in propagation are random, and are useful to introduce uncertainty in timing estimates for a malicious attacker. Once a peer receives a certain transaction, the peer may not accept future relays of the same transaction; for example, the transaction hash may be stored in the peer's memory pool, allowing the peer to reject identical transactions. The "diffusion" of transactions through the network is symmetric, meaning that a forwarding node does not use information about the IP addresses of the neighbouring nodes to influence the transaction broadcast. For example, in "standard" diffusion processes (utilized in the Bitcoin protocol), the peers of a broadcasting node all receive the same transaction and in each relay instance only one transaction at a time is relayed per peer. The symmetric nature of this "diffusion" may be exploited by malicious third parties having knowledge of the peer-to-peer graph structure of the network in conducting de-anonymizing attacks.

The present disclosure provides alternative techniques for transactions relay on blockchain networks, to improve protection against traffic analysis attacks. More particularly, the proposed relay protocols may be used to disguise, conceal or obfuscate connections between source nodes of transactions and their IP addresses.

A transactions relay protocol, Diffusion Mixer Protocol (DMP), is proposed. DMP includes two independent diffusion stages. The first stage ("random differential relay", or RDR) allows for relayed transactions mixing and obfuscation of transaction sources. During the random differential relay stage, each node waits a predefined amount of time before broadcasting a transaction to the network, to receive and collect a plurality of transactions from its peers. The node then creates outgoing connections to its "entry nodes", and sends to an arbitrarily (e.g., randomly) selected subset of these entry nodes different transactions with approximately the same timestamps. Entry nodes of a node are those neighbouring nodes to which direct outgoing connections can be established from the node. The randomness in the choice of entry nodes and the diversity in the relayed transactions may make the reconstruction of the network topology more difficult for an attacker.

The second stage ("standard diffusion") ensures a timely and reliable propagation of transactions within the network. In the standard diffusion stage, each node relays the same transaction to all its entry nodes, and in each relay instance only one transaction at a time is relayed per entry node.

It should be noted that in a network of nodes, such as a blockchain network, one or more of the nodes may be capable of implementing the DMP. Specifically, one or more of the nodes of the network may be able to relay its received data packets to its entry nodes by participating in the DMP. A participating node may, for example, select between an RDR process and a standard diffusion process, for propagating a particular data packet. The nodes of the network may elect to participate in the DMP, joining the protocol either via a decentralized manner or through inclusion in a group of participating nodes assembled by a central authority. A participating node relays its output network packets according to the DMP. In particular, if a participating node receives a data packet, the node may forward the received data packet according to a mode of propagation that is selected for that node, using the rules stipulated by the DMP.

The proposed DMP for transactions relay is described with reference to FIGS. 3 to 7. A schematic visualization of the DMP is provided in FIG. 3. An example blockchain network 300 of nodes is shown. Each node represents a network terminal (i.e., a blockchain node), while edges represent links between nodes. For the purposes of this illustration, it is supposed that for each link, it is possible to send or receive a single bit at a time.

In this example network 300, each node maintains a set of unconfirmed transactions so that when a node receives a new transaction, it is propagated through the network to all other nodes. Each node is to validate and store the new transactions in their respective local set and forward the new transactions to any peer nodes that do not yet have the new transactions. Due to the peer-to-peer nature of the blockchain network 300, all nodes do not receive a new transaction at the same time, meaning it will take some time for a new transaction to reach all nodes in the network 300.

Figure 3:
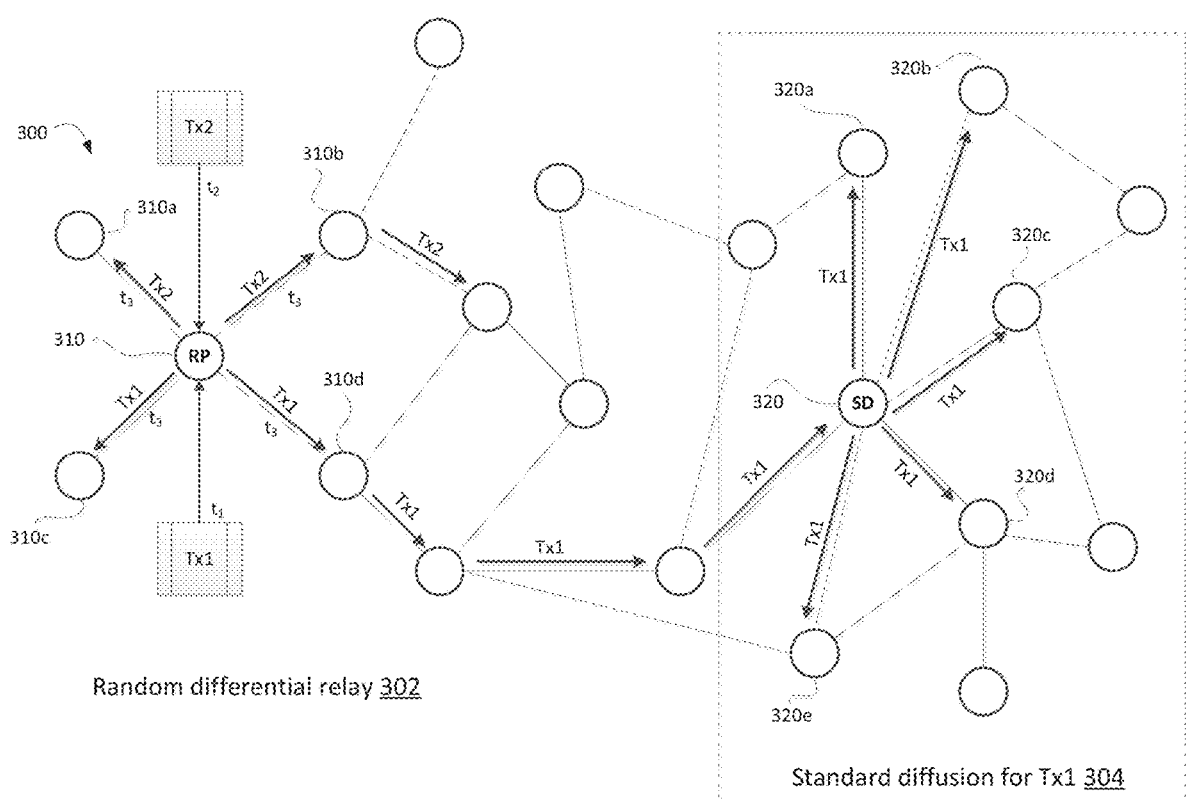
FIG. 3 is a schematic diagram of a protocol, Diffusion Mixer Protocol (DMP), for propagating a transaction in an example network of nodes.

FIG. 3 illustrates the two stages of the DMP for propagating a particular transaction Tx1, namely the random differential relay 302 and the standard diffusion 304 for Tx1. The source node 310 of transaction Tx1 may either generate the transaction Tx1 or receive it from a peer node, at a time, $t_1$. In accordance with the DMP, source node 310 waits to receive at least one more incoming transaction from its neighbouring nodes prior to initiating broadcast of the received/queued transactions. In the example of FIG. 3, once transaction Tx2 is received by source node 310 at time $t_2$, the transactions Tx1 and Tx2 are sent to an arbitrarily selected subset of the source node 310's entry nodes at time $t_3$. Transaction Tx1 is forwarded to entry nodes 310c and 310d, while transaction Tx2 is forwarded to entry nodes 310a and 310b. The example of FIG. 3 is only illustrative; in particular, the source node 310 may wait to receive more than two incoming transactions before propagating any of its received transactions.

The entry nodes relay the received transactions to their own peers. For example, nodes 310b and 310d forward transactions Tx2 and Tx1, respectively, to one or more of their neighbouring nodes. In the DMP, each recipient of a transaction independently selects a mode of propagating the received transaction. Node 320 is an example of a node which selects standard diffusion as its diffusion mode. As shown in FIG. 3, node 320 forwards the same transaction, Tx1, to all its entry nodes, namely 320a, 320b, 320c, 320d, and 320e.

Figure 5:
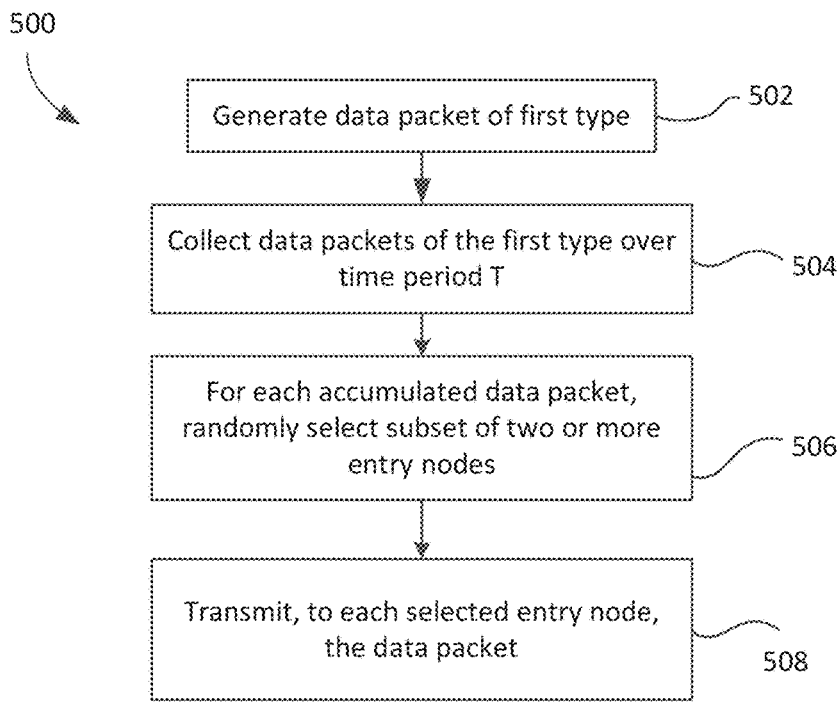
FIG. 5 shows, in flowchart form, an example process for propagating data packets in a blockchain network, in accordance with the DMP.

Reference is now made to FIG. 5, which shows, in flowchart form, an example process 500 for propagating data packets in a network, in the RDR stage of DMP. The process 500 is implemented by a node of, for example, a blockchain network, such as network 100. A node may be understood, in this context, to refer to a mining node, full node, validator node, or other type of discrete blockchain node in the blockchain network. The node is a computing device with network connection(s), computing resources, and executing software implementing the blockchain protocol.

In operation 502, the client associated with the node generates at least one data packet of a first type. In the context of a blockchain network, the data packet of a first type may comprise a blockchain transaction. That is, the client may generate a blockchain transaction which is to be propagated to the other nodes of the network.

In operation 504, the node collects a set of data packets of the first type during a first time period, T. That is, the node accumulates data packets of the first type over a period of time. The set includes the at least one generated data packet and at least one data packet of the first type that is received from one or more peer nodes in the network. In this way, the data packets generated by the node are mixed with those data packets of the same type that are received from neighbouring nodes. In a blockchain network, during the time period T, the node accumulates a set of transactions by monitoring the network for incoming transactions to be relayed. The length of time period T may be predefined. In some example implementations, the length of time may vary based on parameters such as average connection times, average number of transactions received per unit of time, or the node's centrality (i.e., the number of incoming connections to the node) within the network. During the time period T, the node may only be permitted to accumulate data packets of the first type, and therefore may be prevented from transmitting any data packets of the first type for the duration of time period T.

In operation 506, the node arbitrarily selects a subset of its entry nodes to which different sets of the collected data packets will be forwarded. More specifically, for each data packet in the set of collected data packets, the node arbitrarily selects two or more of its entry nodes (i.e., neighbouring nodes, with which the node has outgoing connections), and assigns the data packet for relay to the selected entry nodes. For example, the entry nodes may be selected randomly. The node may, in some implementations, query the network to obtain fresh addresses of its peers. In the Bitcoin network, the node may query one or more database source names (DSN) embedded in Bitcoin Core, BitcoinJ, or other blockchain protocol, and maintained by Bitcoin (or other blockchain) community members. As a response, the node will get one or more DSN records showing the IP addresses of available full nodes which may accept incoming connections. A decentralized version of peer discovery may be implemented by having peers send "ADDR" messages containing their IP addresses and port numbers to a new node that joins the network.

Figure 4:
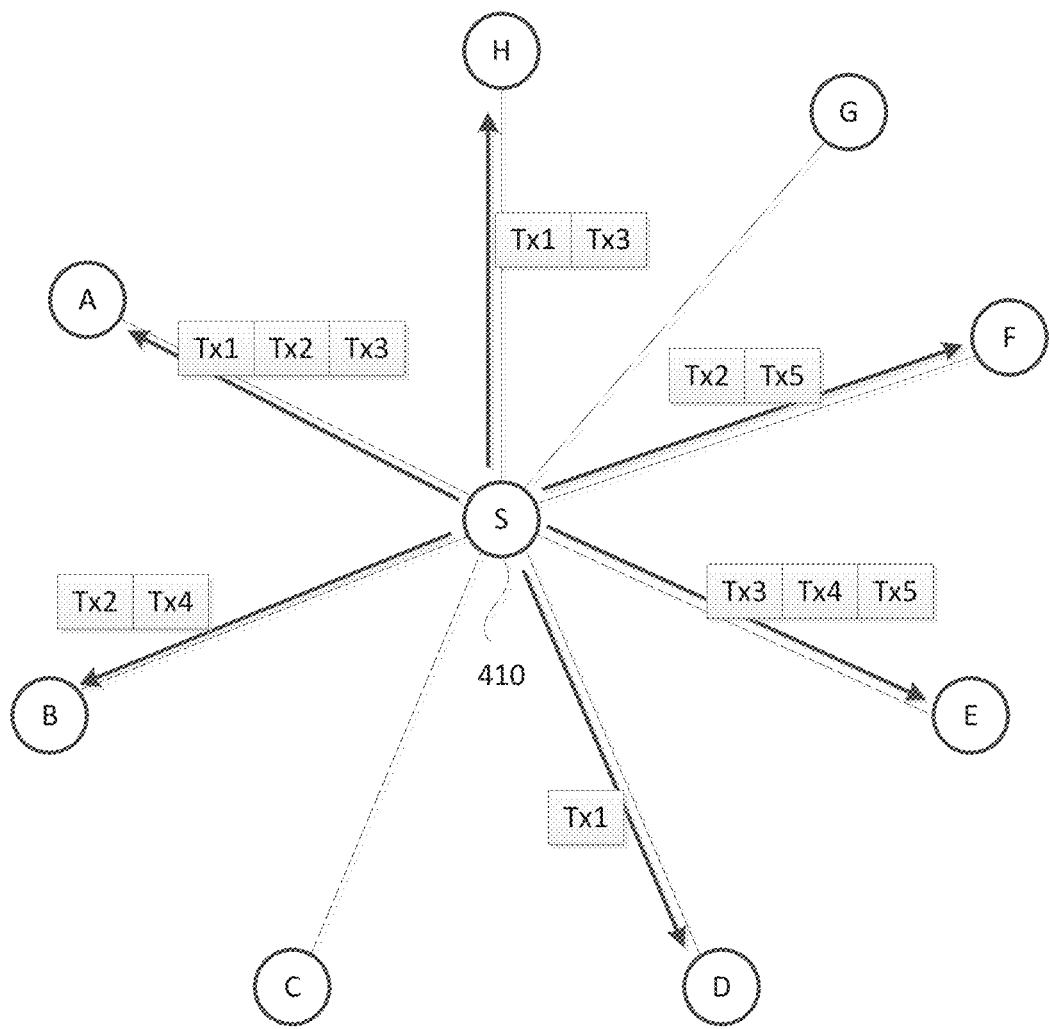
FIG. 4 illustrates an example of a relay of transactions in a network of nodes, in accordance with the DMP.

In some implementations, as part of operation 506, one or more of the nodes in a network may maintain a table or other data structure tracking its assignment of each collected data packet to entry node(s) that the data packet should be relayed to. FIG. 4 shows an example of transactions relay for source node 410 in the RDR stage of the DMP in a blockchain network. Table 1 is an example assignment of the collected transactions, Tx1-Tx5, to the entry nodes of source node 410. The entry nodes are indicated as nodes A, B, C, D, E, F, G, and H. As shown in FIG. 4 and Table 1, the source node 410 relays each transaction to at least two entry nodes, and multiple transactions can be relayed via the same node. For example, transactions Tx3, Tx4, and Tx5 are all simultaneously relayed via entry node E. More generally, in the RDR process, multiple data packets can be simultaneously relayed to the same peer node by a forwarding node. Not all entry nodes receive transactions from source node 410 in a given instance of the DMP. In the example of Table 1, entry nodes C and G do not receive any transactions from source node 410.

TABLE 1

| Transactions/Nodes | Relay 1 | Relay 2 | Relay 3 |
|---|---|---|---|
| Tx1 | Node A | Node D | Node H |
| Tx2 | Node E | Node B | Node F |
| Tx3 | Node E | Node A | Node H |
| Tx4 | Node B | Node E | |
| Tx5 | Node E | Node F | |

Referring again to FIG. 5, for each collected data packet, in operation 508, the node transmits the data packet to each of the (arbitrarily or randomly) selected entry nodes. Each selected entry node is configured to relay the data packet to one or more second nodes (e.g., peers of the entry node) in the network using a mode of data propagation that is randomly selected for that entry node. That is, each selected entry node forwards the received data packet to one or more of its own peers using a propagation mode that is independently chosen for that entry node. In the example transactions relay of FIG. 4, each of transactions Tx1-Tx5 is forwarded to the entry nodes to which the transaction is assigned.

Each node receiving a transaction from source node 410 then randomly selects a mode of propagation/diffusion to use in forwarding the received transaction to one or more of its peer nodes (if any). In particular, an entry node that receives a transaction selects, on a random basis, between relaying the transaction according to the standard diffusion process or the RDR process. The choice between the two options is random. Thus, in the DMP, the two diffusion processes alternate probabilistically, i.e., there is not a clear separation between the RDR stage and the standard diffusion stage. As a result of this "mixing" of diffusion processes, it becomes more difficult for an attacker to reconstruct a topology of the network based on identifying a separation between the sets of nodes relaying via random data propagation or via standard diffusion.

In some implementations, the random selection by an entry node of the diffusion mode may involve receiving, from the source node, a message in addition to the relayed data packet. The entry node may then generate a random value (e.g., random number), append it to the received message, and hash the result, for example, using SHA-256. The entry node can then check the hash value and subsequently obtain the diffusion mode based on predetermined rules regarding the hash value (e.g., if the final character of the hash is a digit, select the RDR as mode of diffusion). Alternatively or additionally, the selection of the diffusion mode can be done using any randomized process (e.g., random number generator), where the probability of selecting one of the modes may be greater than that of selecting the other of the modes, depending on factors such as number of incoming and/or outgoing connections, average number of data packets received per unit of time, etc.

In propagating a particular data packet, it may be desirable to balance the level of anonymity protection for the propagating nodes with the overall speed of propagation. If the measures to ensure a certain level of anonymity are too cumbersome (e.g., requires too many network resources, nodes of the network are intentionally underutilized in relaying data packets, etc.), the efficacy of the network in timely spreading data may be impaired. Accordingly, in some implementations, the random selection of the mode of propagation by a relaying node may be weighted. In particular, different probabilities may be assigned to each of the two or more modes of propagation (i.e., RDR, standard diffusion, etc.) so that the probabilities reflect the proportional significance of anonymity and speed of data propagation. For example, in some instances, a higher predefined probability may be associated with the RDR mode for the nodes of a particular network, reflecting a proportionally greater emphasis on preserving anonymity of the propagated data.

Figure 6:
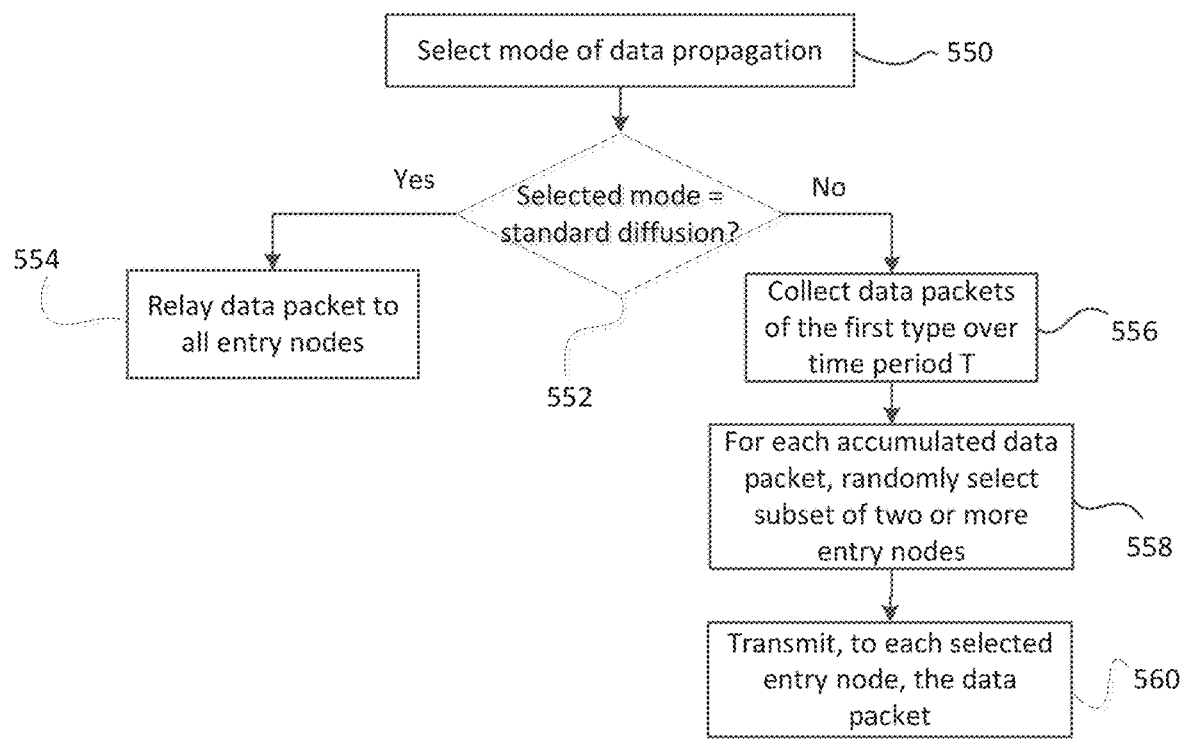
FIG. 6 shows, in flowchart form, another example process for propagating data packets in a blockchain network, in accordance with the DMP.

The process 500 of FIG. 5 is implemented by a node which generates its own data packet of a first type. In particular, a node that participates in the DMP and generates a data packet for propagation to the rest of the network performs the process 500. FIG. 6 shows an example process performed by a relay node, or a node which forwards or relays a data packet that is generated by a different node. That is, a relay node is a node that does not itself generate data to transfer during the relay of a specific data packet, instead serving the function of "relaying" the data packet. In operation 550, the relay node independently selects its own mode of data propagation. A relay node may, for example, select between a RDR mode and standard diffusion mode. If the standard diffusion mode is selected (which may be determined at operation 552), the relay node forwards the data packet to all of its entry nodes in operation 554. In the example of FIG. 6, the selection of propagation mode is between two possible options; this example is not limiting and in other examples, there may be three or more possible modes of propagation. If, in the process 500 the selected mode is RDR (which may be determined at operation 552), the relay node performs the steps 556, 558 and 560 which correspond to the operations 504, 506 and 508 of FIG. 5.

Figure 7:
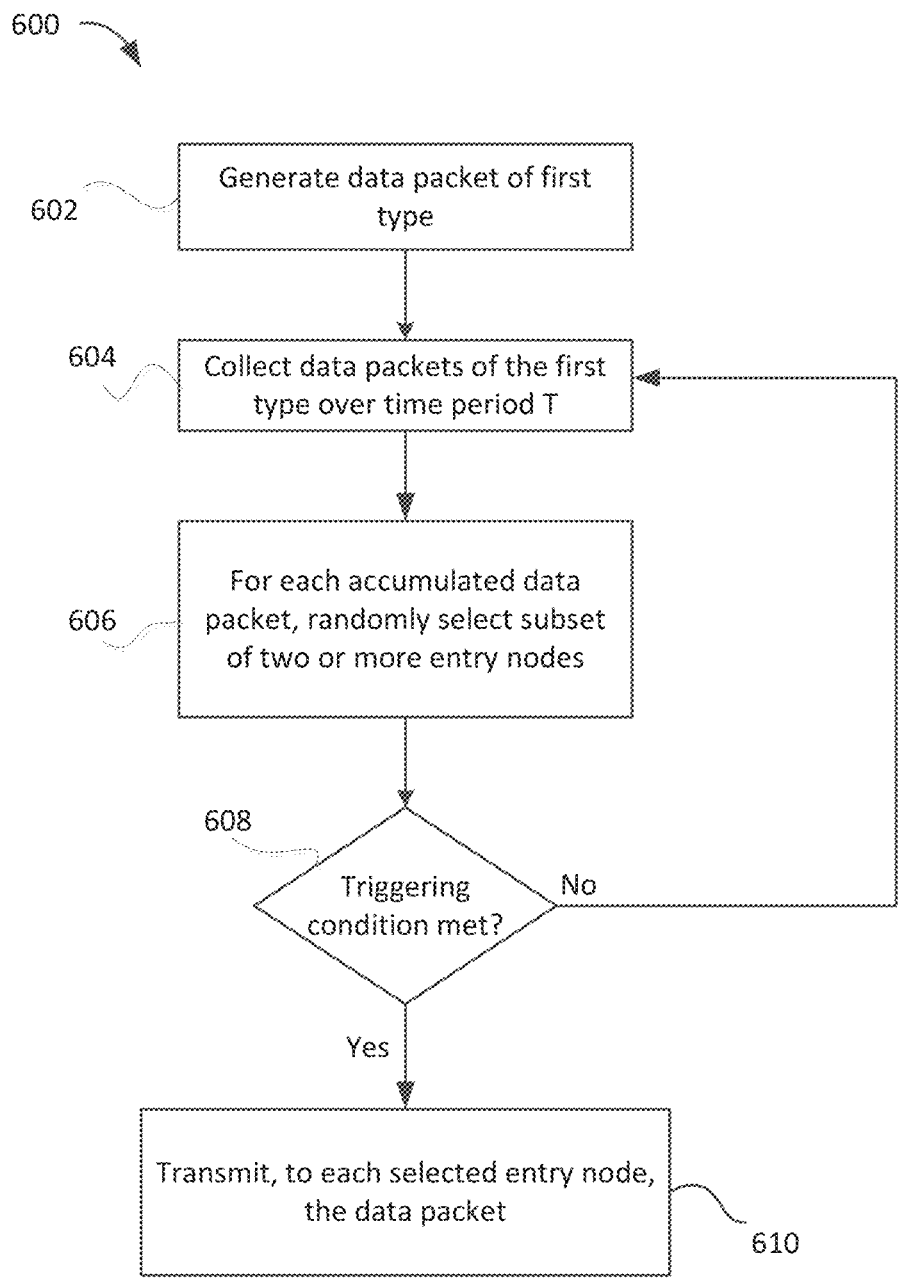
FIG. 7 shows, in flowchart form, another example process for propagating data packets in a blockchain network, in accordance with the DMP.

Reference will now be made to FIG. 7, which shows, in flowchart form, an example process 600 for propagating data packets in a network. The process 600 may be implemented at a blockchain node having a plurality of incoming and outgoing connections to other nodes of a blockchain network.

Operations 602, 604, 606 and 610 of process 600 correspond to operations 502, 504, 506 and 508 of process 500, respectively. In operation 608, the node determines whether a triggering condition has been met, prior to transmitting a collected data packet to its assigned entry node in operation 610. In particular, the transmitting of the data packet is performed in response to detecting that a suitable triggering condition has been satisfied. When the triggering condition has not been met, the node continues to collect data packets of the first type without relaying any of said data packets to its entry/peer nodes.

A triggering condition may be employed to direct the node to collect a sufficient number of incoming data packets and/or to collect incoming data packets for a sufficient amount of time. For example, sufficiency may be determined based on a defined threshold. By collecting a plurality of incoming data packets prior to, for example, simultaneously propagating them to peer nodes in the network, an attacker that monitors the relay traffic originating from the node may not be able to easily identify the node as the correct source of the relayed data packets.

In some implementations, the triggering condition may be the expiry of a predetermined duration since the time of generation of the at least one data packet of the first type by the node in operation 602. That is, the node may be designed to monitor and collect incoming data packets (e.g., transactions) for a predetermined period of time that begins when the node generates a data packet of the same type, before any of said data packets are propagated by the node. This condition may be useful in trying to ensure that a data packet that is generated by the node is propagated after having collected more data packets of the same type that can be simultaneously broadcasted, thereby rendering it difficult for an attacker to correctly identify the node as the source of the generated data packet.

In some implementations, the triggering condition may be the expiry of a predetermined duration since the time of receipt of a first of the at least one incoming data packet of the first type from the node's peers. That is, the node may be designed to monitor and collect incoming data packets for a predetermined period of time that begins when a first of such incoming data packets is received. This condition may be useful in trying to ensure that more data packets, either data packets generated by the node itself or received from other peers, are collected by the node prior to any broadcast to the rest of the network.

In some implementations, the triggering condition may be the number of collected data packets during the first time period reaching a threshold number. In particular, the node may be designed to monitor and collect incoming data packets until the earlier of the expiry of the first time period or a predetermined threshold number of data packets being collected by the node.

Heuristics for Random Differential Relay

As described above, random differential relay represents a departure from the "standard diffusion" protocol for propagating transactions in a network of nodes. In implementing RDR, a propagating node relays different transactions simultaneously to a randomly selected subset of entry nodes. The propagating node may create a data structure, such as the data structure illustrated in Table 1, by randomly assigning to each collected transaction one or more entry nodes that the transaction should be relayed to. More generally, a network node that relays data packets to its peers may maintain its own internal routing data structures which specify the type of relay to perform for each of a plurality of data packets collected (i.e., received or locally generated) by the node.

In the context of the Diffusion Mixer Protocol proposed herein, each node in the blockchain network that implements RDR may build its own routing data structure, or "RDR table", independently. An RDR table defines a transaction allocation scheme for each node that adopts the RDR protocol. That is, an individual node's RDR table is used to manage what transactions are to be relayed or routed to which peer and when. The RDR table may keep track of all the transactions received or generated in a given amount of time, $\Delta T_{RDR}$, as well as the source peers of transactions. An RDR table may include additional information, such as: time of arrival of the first instance of a transaction ("ToA timestamp"); times chosen for relaying a transaction ("ToR timestamp"); and/or counter of the number of instances of the same transaction received by the node. An example RDR table is provided below.

TABLE 2

| Transaction ID | Sources | Destinations | Data |
| --- | --- | --- | --- |
| tx$_1$ | a, b, d | c, e | ... |
| tx$_2$ | [local] | a, c, e | ... |
| tx$_3$ | d, e | a, b | ... |

A node's local RDR table may be updated dynamically (i.e., in real-time) as new information (timeouts, transactions received/generated, node input/output capacity constraints, etc.) becomes available. The present disclosure provides various heuristics, or "sub-systems", which contribute to the building and updating of individual RDR tables. These sub-systems can be considered as sets of rules or guidelines which may be applied to update transaction allocations as specified in RDR tables. The strategies encompassed by these sub-systems may be useful in enhancing transaction source obfuscation and balancing network traffic generated by the relay operations of an individual node. The proposed set of sub-systems, namely source mixing, relay mixing, destination mixing, time-of-arrival mixing, and source control, may work in parallel, while a load balancing module can be used to merge the transaction relay information collected and provide an optimized allocation of network resources.

Figure 8:
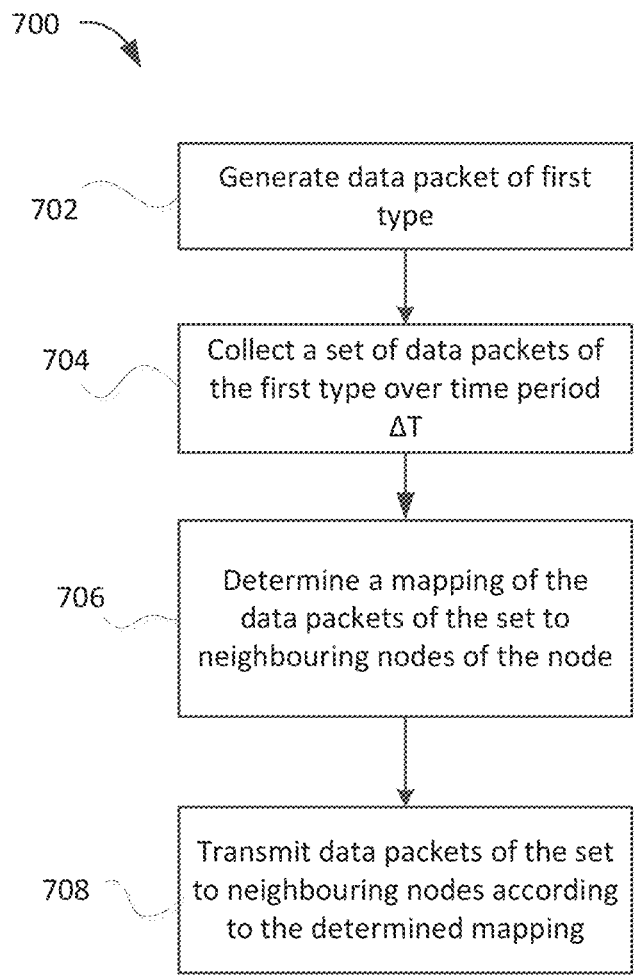
FIG. 8 shows, in flowchart form, an example process for transmitting data packets generated or received at a node in a blockchain network.

Reference is now made to FIG. 8, which shows in flowchart form, an example process 700 for transmitting data packets that are either generated or received at a node in a network. The process 700 represents a technique of propagating data in a network according to a transaction allocation scheme that complies with the rules of at least one of the proposed sub-systems/heuristics. The process 700 is implemented by a node of, for example, a blockchain network, such as network 100 of FIG. 1. More specifically, the process 700 is performed by a node that participates in the DMP and is configured to generate or receive data packets of a first type (e.g., transactions) for propagation to the rest of the network.

In operation 702, the client associated with the node generates at least one data packet of a first type. The data packet may, for example, comprise a blockchain transaction.

In operation 704, the node collects a set of data packets of the first type during a first time period, T. That is, the node accumulates data packets of the first type over a period of time. The set includes the at least one generated data packet and at least one data packet of the first type that is received from one or more peer nodes in the network. In this way, the data packets generated by the node are mixed with those data packets of the same type that are received from neighbouring nodes.

In operation 706, a mapping of the data packets of the collected set to a plurality of neighbouring nodes connected to the node is determined. The mapping indicates an expected time of relay of each data packet of the set to the neighbouring nodes. This "mapping" is used to construct the individual local RDR tables for nodes of the network. One or more of the sub-systems/heuristics described in the present disclosure may contribute (in parallel or independently) to construction of the RDR tables. In particular, one or more different sub-mappings may be applied in determining the mapping of the collected data packets to neighbouring nodes. The sub-mappings may be of at least two different types. A first type of sub-mapping allocates any two data packets having a same source (i.e., originating node) for relay to different subsets of the neighbouring nodes. The "source mixing" and "relay mixing" sub-systems described in greater detail below are examples of this first type of sub-mapping. A second type of sub-mapping assigns different expected times of relay to any two data packets that are generated at the node or received by the node from peer nodes in a same time interval. The "time-of-arrival mixing" sub-system is an example of this second type of sub-mapping.

In operation 708, once the mapping of the data packets of the collected set to neighbouring nodes is determined, said data packets are transmitted to neighbouring nodes in accordance with the determined mapping.

It will be understood that the individual sub-systems may be independently implemented to update the transaction allocations defined in an RDR table. That is, each sub-system can be adopted separately for an RDR table, independently of the other sub-systems. Accordingly, the individual sub-systems may provide different ways of allocating transactions to relay nodes and, consequently, different techniques for propagating transactions.

Source Mixing

The principle underlying the source mixing sub-system is that transactions generated locally at a node should be transmitted to non-overlapping subsets of peers. By way of illustration, if node x generates two transactions $tx_i$ and $tx_{i+1}$, the sets of peers selected for relay of those transactions, denoted $S(tx_i)$ and $S(tx_{i+1})$, respectively, satisfy $$S(tx_i) \neq S(tx_{i+1})$$

That is, the sets of peers for two subsequent transactions differ by at least one peer. This inequality can help to complicate any malicious search for patterns for the initial relay of transactions generated at a node. This concept can be extended to a source mixing of degree $\delta^{SM}$ as follows:

$$S(tx_{i+a}) \neq S(tx_{i+b}), \forall (a, b) \in [0, \delta^{SM} - 1], a \neq b$$

Figure 9:
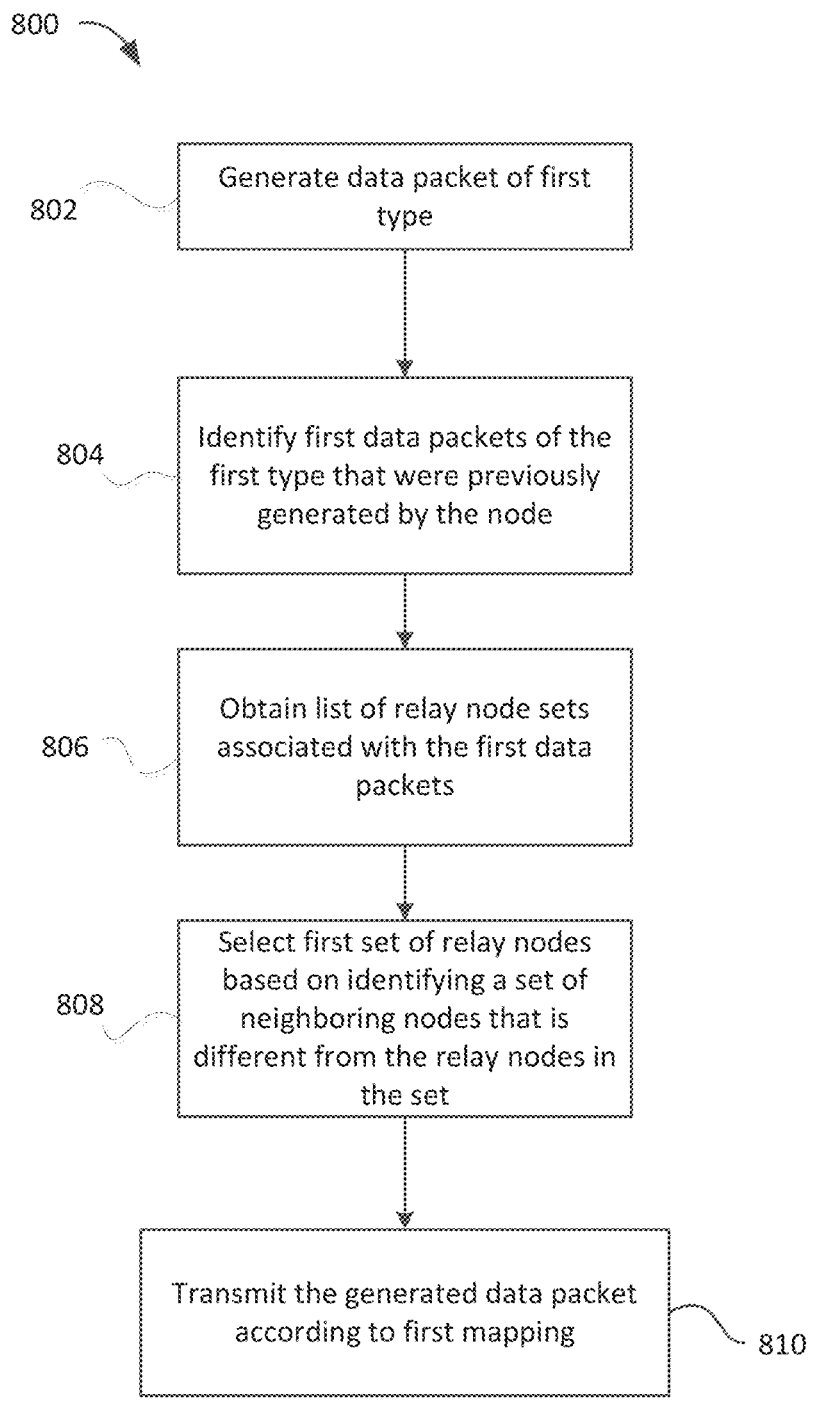
FIG. 9 shows, in flowchart form, an example process for transmitting data packets generated at a node in a blockchain network.

Reference is now made to FIG. 9, which shows in flowchart form, an example process 800 for transmitting data packets generated at a node in a network. The process 800 represents a technique of propagating data in a network according to a transaction allocation scheme that complies with the rules of a source mixing sub-system/heuristic. The process 800 is implemented by a node of, for example, a blockchain network, such as network 100 of FIG. 1. More specifically, the process 800 is performed by a node that participates in the DMP and generates data packets of a first type (e.g., transactions) for propagation to the rest of the network.

In operation 802, the client associated with the node generates at least one data packet of a first type. The data packet may, for example, comprise a blockchain transaction.

The node determines a first mapping of the at least one generated data packet to its neighbouring nodes (i.e., peers). In particular, a plurality of subsets of peers are selected for relaying the data packets that are generated at the node. Each data packet is associated with a specific subset of relay nodes by the first mapping. For each data packet, in operation 804, a predetermined number of first data packets of the first type that were previously generated by the node are identified. These may be data packets which have already been transmitted to peers by the node, or data packets which were previously generated but have yet to be relayed to the node's peers.

In operation 806, a list of relay node sets associated with the first data packets is obtained. The relay node sets comprise those neighbouring nodes (peers) to which the first data packets are respectively relayed (or allocated for relaying). That is, the relay node sets indicate the subsets of peers of the node to which individual ones of the first data packets are allocated.

In operation 808, a first set of relay nodes is selected based on identifying a set of neighbouring nodes that is different from the relay node sets in the list obtained in operation 806. For example, the first set of relay nodes may be chosen by arbitrarily selecting a set of two or more neighbouring nodes that is not included in the obtained list of relay node sets. In some implementations, a requirement may be imposed that the selected first set be different from the relay node sets in the obtained list by two or more peers. That is, an upper limit may be set on the number of elements belonging to the intersecting set between the selected first set of relay nodes and any one of the relay node sets in the obtained list.

The process 800 may be performed by a node after a single data packet is generated at the node, or after the node collects a plurality of generated data packets. In particular, the node may generate and accumulate data packets of a first type over a period of time (similar to the RDR stage of DMP) and determine a first mapping of the accumulated data packets to relay node sets. In these cases, the data packets may be respectively allocated to arbitrarily selected subsets of relay nodes, ensuring that no two such subsets are equal to each other.

The number of neighbouring nodes that are selected for inclusion in the first set of relay nodes may be arbitrarily determined. In at least some implementations, the number of peers selected for the first set is bounded according to the bandwidth requirements (e.g., cumulative amount of incoming and outgoing data within fixed timeframes) of the propagating node. In particular, the number of peers selected for relay of locally generated transactions may be adjusted in order to address network load issues or to improve source obfuscation. For example, the number of peers included in the first set may be defined by $$m(tx_i) = m^{SM} \pm rnd(\zeta^{SM})$$

where $m^{SM}$ is a nominal value representing the average number of peers selected for relay in source mixing sub-system and $rnd(\zeta^{SM})$ represents a random integer number between 0 and $\zeta^{SM}-1$.

The selection of the first set of relay nodes can then be set in the first mapping in association with the respective data packet. In other words, the first mapping may indicate that the data packet is associated with (i.e., allocated to) the first set of relay nodes. In operation 810, the data packet is transmitted according to the determined first mapping.

Relay Mixing

The relay mixing sub-system is premised on the concept that transactions received by a node should be relayed to non-overlapping subsets of the node's peers. Using the parameter λ to represent the number of elements belonging to the intersecting set between the relaying peers selected for two different transactions received by the same node, the idea behind relay mixing can be captured by $$|S(tx_{j+a}) \cap S(tx_{j+b})| \leq \lambda \quad \forall\, (a, b) \in [0, \delta^{RM} - 1], a \neq b \quad (A)$$

where $\delta^{RM}$ is the degree of relay mixing. The Inequality (A) defines a transaction allocation problem of finding allocations of transactions to relay nodes that satisfy the inequality. The relay mixing strategy can thus be controlled by varying the parameter λ in (A). Once λ is set, an iterative search for a suboptimal solution to the transaction allocation problem is performed. The relay mixing sub-system may require that the Inequality (A) be satisfied for each peer $p_i$ from which the node receives one or more transactions. For example, the last $\delta^{RM}$ transactions received $(tx_j, tx_{j+1}, \ldots, tx_{j+\delta^{RM}-1})$ from peer $p_i$ may be used to implement the relay mixing by requiring Inequality (A) to be satisfied for those transactions. Accordingly, in some implementations, an individual parameter $\lambda_i$ may be defined for each peer $p_i$, respectively. In this way, source obfuscation may be implemented by creating an independent data structure for transaction relay for each peer $p_1, p_2, \ldots, p_m$ from which the node receives transactions, identifying allocations of the received transactions to relay nodes.

Alternatively, in other implementations, the parameter k may be a unique system parameter; a time-varying parameter $\lambda^t$ updated using a specific time window and information stored in the RDR table; or a time-varying parameter $\lambda_i^t$ for each peer and updated using a specific time window and information stored in the RDR table.

The number of combinations of transaction allocations for a generic peer is $$C = \binom{m}{x} \delta^{RM},$$

where m is the number of peers of the node, $\delta^{RM}$ is the degree of relay mixing, and x is an average number of peers selected for relay. The iterative search for a suboptimal solution may proceed in several possible ways:

- Set a maximum number of iterations and select the transaction allocation with the smallest number of intersecting peers
- Set a maximum number of iterations but interrupt the process earlier if a given threshold of intersecting peers is reached
- Set a maximum number of iterations and increase the value of λ if the requirements are not met, then restart the process
- Set a maximum number of iterations and modify the value of x if the requirements are not met, then restart the process
- Set a maximum number of iterations and reduce the value of m if the requirements are not met, then restart the process.

Another set of approaches can be considered if the maximum number of iterations is substituted with a fixed time window $\Delta T_{RM}$.

The number of neighbouring nodes that are selected for inclusion in the set of relay nodes may be arbitrarily determined. In at least some implementations, the number of peers selected for the set is bounded according to the bandwidth requirements (e.g., cumulative amount of incoming and outgoing data within fixed timeframes) of the propagating node. In particular, the number of peers selected for relay of locally generated transactions may be adjusted in order to address network load issues or to improve source obfuscation. For example, the number of peers included in the first set may be defined by $$m(tx_i) = m^{RM} \pm rnd(\zeta^{RM})$$

where $m^{RM}$ is a nominal value representing the average number of peers selected for relay in relay mixing sub-system and $rnd(\zeta^{RM})$ represents a random integer number between 0 and $\zeta^{RM}-1$. In some implementations, $\zeta^{SM}$ and $\zeta^{RM}$ may have the same value.

Figure 10:
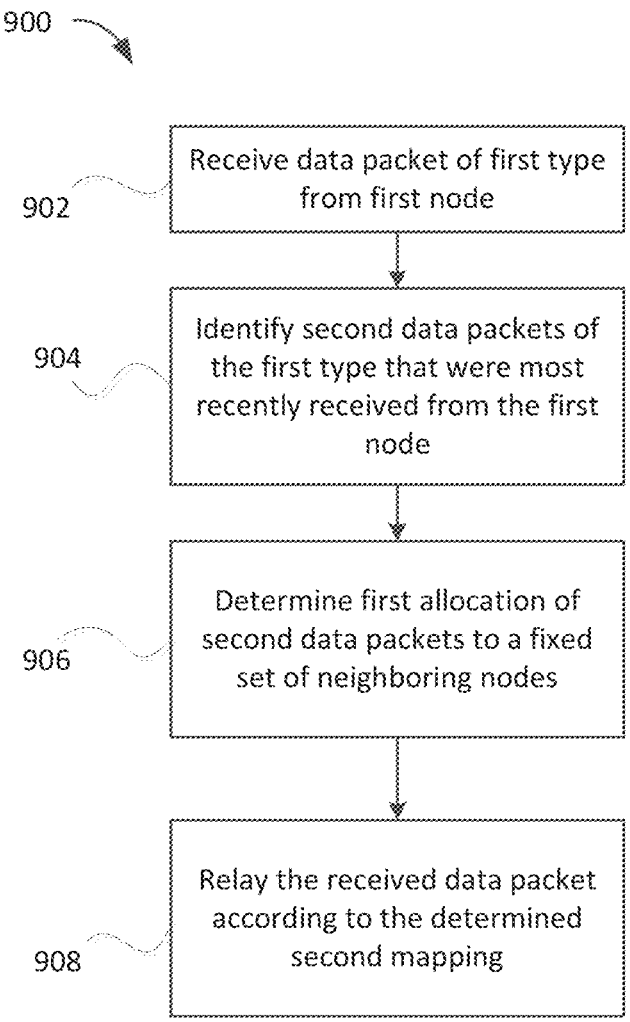
FIG. 10 shows, in flowchart form, an example process for relaying data packets received at a node in a blockchain network.

Reference is now made to FIG. 10, which shows in flowchart form, an example process 900 for relaying data packets received at a node in a network. The process 900 represents a technique of propagating data in a network according to a transaction allocation scheme that complies with the rules of a relay mixing sub-system/heuristic. The process 900 is implemented by a node of, for example, a blockchain network, such as network 100 of FIG. 1. More specifically, the process 900 is performed by a node that participates in the DMP and receives data packets of a first type (e.g., transactions) for propagation to the rest of the network.

In operation 902, the client associated with the node receives at least one data packet of a first type. The data packet may, for example, comprise a blockchain transaction.

The node determines a second mapping of the at least one received data packet to its neighbouring nodes (i.e., peers). In particular, a plurality of subsets of peers are selected for relaying the data packets that are generated at the node. Each data packet is associated with a specific subset of relay nodes by the second mapping. For each data packet, in operation 904, a predetermined number of second data packets of the first type that were most recently received by the node are identified. These may be data packets which have already been transmitted to peers by the node, or data packets which were previously received but have yet to be relayed to the node's peers.

In operation 906, a first allocation of the second data packets to a fixed set of neighbouring nodes is determined. In particular, the first allocation is selected from one or more allocations of the second data packets to neighbouring nodes that satisfy a predetermined condition. This operation corresponds to the iterative search for a suboptimal solution to Inequality (A) described above. That is, of the allocations of data packets to relay nodes that satisfy (A), a unique allocation (e.g., an allocation with fewest intersecting peers) is determined. As captured by (A), an allocation of second data packets to a fixed set of neighbouring nodes satisfies a predetermined condition if, for any two of the second data packets, a number of neighbouring nodes to which both said second data packets are allocated (for relaying) is less than or equal to a predefined threshold value.

The unique allocation of the second data packets to neighbouring nodes identified in operation 906 can then be set in the second mapping. In other words, the second mapping may indicate the relay nodes to which the second data packets (i.e., data packets received by the node from its peers) are respectively allocated. In operation 908, the at least one received data packet is relayed according to the determined second mapping.

The process 900 may be performed by a node after a single data packet is received at the node, or after the node collects a plurality of received data packets. In particular, the node may receive and accumulate data packets of a first type over a period of time (similar to the RDR stage of DMP) and determine a mapping of the accumulated data packets to relay node sets. In these cases, the data packets may be respectively allocated to arbitrarily selected subsets of relay nodes, ensuring that no two such subsets are equal to each other.

Destination Mixing

Figure 11:
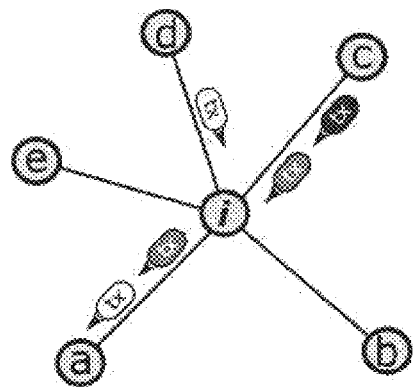
FIG. 11 illustrates an example of destination mixing in the propagation of data packets in a network of nodes.

The destination mixing heuristic captures the idea that an outbound connection of a node should carry out transactions relayed by different peers. This heuristic may be considered as a special case of the relay mixing sub-system, since the latter involves the creation of non-overlapping subsets of peers for relay from the same source peers. In process 900, destination mixing may be implemented by ensuring that, at operation 906, for any two of the first nodes (i.e., nodes from which the node receives data packets), the set of all second data packets received from said two first nodes is allocated to at least two different neighbouring nodes in the first allocation. For example, FIG. 11 illustrates an example of destination mixing for a node i. The destination mixing sub-system ensures that node a does not receive, in a given time window $\Delta T_{DM}$ two transactions relayed by the same node c. Thus, only one of the two transactions received at node i from node c is relayed to node a.

In some implementations, the destination mixing may be enabled on a different subset of peers for each time window $\Delta T_{DM}$. For example, the subsets may be allocated in a similar way to the one described for source mixing with parameters ($m^{DM}$, $\delta^{DM}$, $\zeta^{DM}$). This strategy may contribute to de-correlation of source and destination for a given transaction.

Time-of-Arrival Mixing

Figure 12:
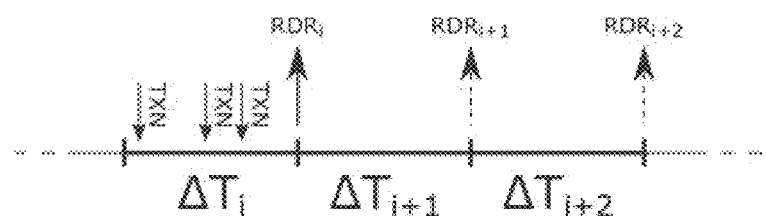
FIG. 12 illustrates an example of a delayed relay of data packets in a network of nodes.

The time-of-arrival mixing heuristic implements a delayed relay of data packets, in order to help de-correlate source and destination information about a data packet relay. For example, data packets (e.g., transactions) that are collected (or generated) within a time window $\Delta T_i$ (e.g., in RDR stage of DMP) may be scheduled for relay at the end of $\Delta T_i$ (RDR$_i$ in FIG. 12). The time-of-arrival mixing sub-system delays the relay past RDR$_i$. In some implementations, the relay of data packets may be delayed by a multiple $q\Delta T_i$, e.g., RDR$_i$, RDR$_{i+1}$, RDR$_{i+2}$, etc. Thus, in accordance with the time-of-arrival heuristic, relaying a received (or generated) data packet by a node includes determining a next scheduled time for relay of received data packets to neighbouring nodes and relaying the data packet a predetermined amount of time after the next scheduled time for relay. All transactions collected within $\Delta T_i$ may be relayed at $\Delta T_i + q\Delta T$, or each transaction j collected within $\Delta T_i$ may be relayed at a given $\Delta T_i + q_j \Delta T$.

The random variable q may, in some examples, have a negative exponential probability density function, $$pdf_q(x) = c \times e^{-(x+g)}$$

where c and g are a multiplicative and an additive constant, respectively.

Source Control

A malicious peer may attempt to push the same data packet (or group of data packets) multiple times to a given node i to try to find a pattern in the local relay strategy of i. For example, a malicious peer node may create two connections to node i and monitor how incoming and outgoing traffic for i are correlated. The source control sub-system is implemented by setting a particular threshold for the number of data packets that can be received from each peer. If a peer exceeds the threshold for a given data packet, its connection will be permanently or temporarily closed. The number of instances in which a node receives a given data packet, such as a blockchain transaction, may be stored in the RDR table.

Load Balancing

Load balancing may be used to periodically perform a shuffle of data packets already allocated for relay to peers by the other sub-systems. The purpose of the load balancing module is to average the relay distribution among the peers, to avoid traffic overload in some peer connections or single point of failures. Two different approaches to load balancing may be implemented:

- Each data packet j has the same weight $w_j$ despite their size (i.e., number of inputs, number of outputs, unlocking and locking script size)
- Each data packet j has its own weight $w_j$, proportional to its size in bytes.

For example, in process 800, a second allocation of the second data packets to the fixed set of neighbouring nodes may be determined, the second allocation being a re-arrangement of the first allocation to account for balancing traffic at output interfaces of the node. A cumulative value $c_i$ can be computed for each peer i over the number of data packets $n_i$ scheduled to relay:

$$c_i = \sum_{k=1}^{n_i} w_k(i)$$

Subsequently, an iterative process is performed to shuffle the data packets to relay and obtain an average c* value for each peer:

$$c^* = \frac{\sum_{i=1}^{m} c_i}{m}$$

Various different heuristics addressing this shuffle of data packets may be available. For example, different priorities may be assigned to different sub-systems, in order to anticipate the relay of a subset of data packets or enhance the load balancing for the outgoing traffic. Moreover, the execution of different sub-systems can introduce duplicates or inconsistent allocations of data packets, which need to be solved before the activation of the relay.

Dynamic Evaluation and Updating of Data Routing Information

The techniques described above provide examples of how to construct and update data routing information. A data structure (RDR table) is maintained at a node, for specifying, at least: which data packets received and/or generated at the node are to be relayed to peer nodes in a network; which peer nodes are to be selected as relay nodes for the data packets; and when the data packets are relayed to the selected peer nodes. The use of RDR tables may be particularly useful in the context of a gossip-based broadcast protocol in which information is disseminated throughout a network of nodes. The sub-systems are directives that can be selectively used to implement various logic for controlling the updating of the RDR tables. Specifically, one or more of the sub-systems may be used to define and update the assignment of data packets for relay to the peers of a network node.

The present application introduces a scheme for evaluating the effectiveness of RDR tables in providing security, anonymity, and timeliness of data relay/broadcasts. The evaluation of the RDR table for a node can be done in real-time. Based on the results of the evaluation, the node may either proceed with the relay assignments as defined in the current RDR table or modify or re-generate the RDR table to obtain new relay assignments. For example, if upon evaluation an RDR table of a node is determined to be unsatisfactory, the node may be configured to automatically regenerate its RDR table, to obtain new assignments of data packets to the node's peers. On the other hand, if the current RDR table is determined to be satisfactory per the results of the evaluation, the node may proceed with broadcasting/relaying data according to the relay assignments of the current RDR table. In this way, a "feedback loop" of evaluating and re-generating the RDR table of a node until the RDR table is determined to be satisfactory (per the results of the evaluation) may be defined for the node. This evaluation process can facilitate the derivation of relay assignments that satisfy pre-defined standards of performance and/or effectiveness for a network node.

In order to describe a framework for evaluating RDR tables of network nodes, it may be useful to introduce a different representation of RDR tables that facilitates computational manipulation of relay assignment information. More specifically, the model of representing relay assignments for a node in an RDR table (e.g., Table 2) can be extended such that the relay assignment data contained in an RDR table is mapped to a form that is suitable for quantitative analysis. In at least some implementations, an RDR table may be mapped to a k×n matrix M, with entries $\mu_{ij}$, where $$\mu_{ij} = \begin{cases} 1, & \text{if } tx_i \text{ is to be relayed to } p_j \\ 0, & \text{otherwise} \end{cases}$$

That is, if the RDR table assigns data packet $tx_i$ to be relayed to peer node $p_j$, then the $\mu_{ij}$ entry is set to 1; otherwise, the entry is set to 0. Accordingly, the columns of the matrix M correspond to the peers of a node, and the rows of the matrix M correspond to data packets which are to be relayed by the node to its peers. The following quantities can be defined for matrix M:

R: the total number of transaction relays analysed $c_j = \sum_{i=1}^{k} \mu_{ij}$: number of data packets to relay per peer $r_i = \sum_{j=1}^{n} \mu_{ij}$: number of relays per data packet.

The parameters k and n are system parameters which may be fixed either globally or locally for each node. An RDR table, constructed and updated by applying one or more of the sub-systems/heuristics described above, can thus be converted to a form that enables quantitative representation of the relay assignment information contained in the RDR table.

When evaluating the relay assignments defined in an RDR table, several different standards may be acceptable for gauging their "performance" or effectiveness in terms of security, anonymity, and/or timeliness of data propagation. One possible way of gauging anonymity performance of an RDR table is to consider the pairwise intersections between sets of peers to which any two different data packets are assigned to be relayed. In particular, it may be desirable that the sets of peers to which any two different data packets are respectively assigned are as disjoint as possible. In other words, the effectiveness of an RDR table (and the relay assignments contained therein) may be characterized by how diverse the sets of relay nodes for pairwise different data packets are. Such diversity of relay node sets may hinder or impede recognition, by an attacker, of patterns in data relay, and thereby serve to protect the identity of a source/origin of data packets.

The exercise of deriving an optimal assignment of data packets to relay nodes for anonymity of data relay may be defined in a quantitative manner. In particular, for a matrix representation, M, of an RDR table, the concept of deriving said optimal assignment may correspond to minimizing the number of non-zero entries per column of M. Expressed differently, this minimization problem may correspond to minimizing the number of different data packets that are relayed by a node to the same peer. In some cases, the minimization problem may be constrained by a total number of data packets to be relayed by the node, and/or predetermined numbers of relays for each of one or more of the data packets.

For the purpose of measuring anonymity performance of an RDR table, a quantitative measure may be usefully defined. Given this measure, one can compare the results obtained from an empirical RDR table, generated via the randomized assignment of data packets effected by the sub-systems described above, with a theoretically optimally RDR table.

In information theory, entropy is defined as an average information content generated by a stochastic source of data. Entropy is a measure of unpredictability of state, or equivalently, of its average information content. Increasing the anonymity of a process may correspond to maximizing entropy of a data structure representing the process.

The entropy of an ensemble $X=(x, A_x, \pi_x)$ where x represents the value of a random variable, taking on one of a set of possible values $A_x=\{a_1, \ldots, a_n\}$ having probabilities $\pi_x=\{\pi_1, \ldots, \pi_n\}$ with $\pi(x=a_i)=\pi_1$ may be defined as $$S(\pi_i) = -\sum_{i=1}^{n} \pi_i \ln \pi_i \quad (1)$$

In the context of a matrix M representing an RDR table, each probability $\pi_i$ may be defined as the probability of having $c_i$ relay for the i-th peer, where $i=1, \ldots, n$. More specifically $$\pi_i = \frac{c_i}{R}$$

with $c_i = \sum_{i=1}^{k} \mu_{ji}$ representing the number of relayed data packets per peer and R is the total number of relays of the first data packets to peer nodes.

Figure 13:
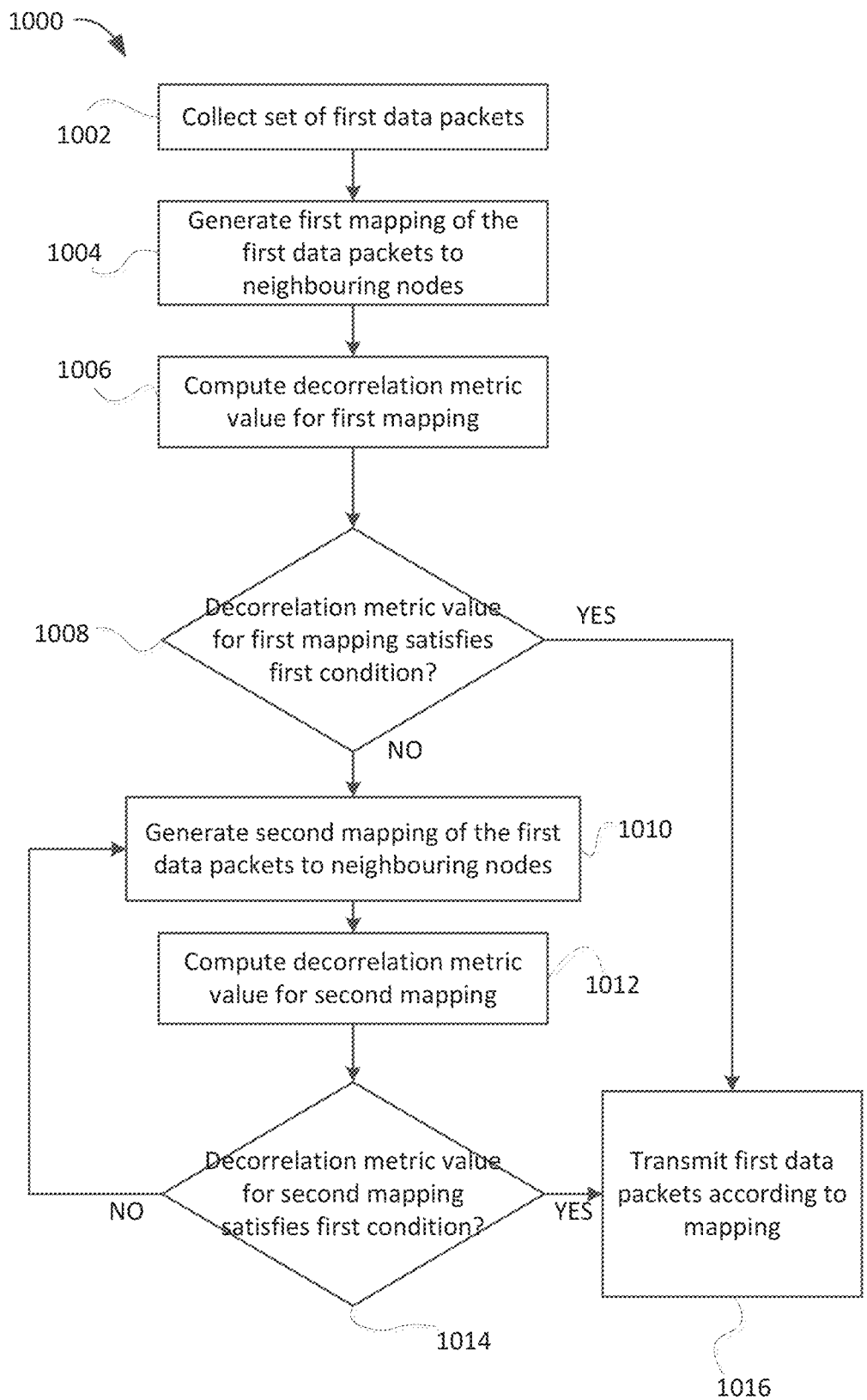
FIG. 13 shows, in flowchart form, an example process for relaying data packets to peer nodes.

Reference is now made to FIG. 13, which shows, in flowchart form, an example process 1000 for relaying data packets to peer nodes. The process 1000 is implemented by a node of, for example, a blockchain network, such as network 100.

In operation 1002, the node collects a set of first data packets during a first time period. The set includes at least one data packet that is received from one or more first nodes in the network. That is, the set includes one or more data packets transmitted from a source that is different from the node itself.

In operation 1004, a first mapping is generated, the first mapping assigning the collected first data packets of the set for relay to one or more neighbouring nodes that are connected to the node. The first mapping defines relay assignments of data packets to peer nodes. The generation of the first mapping may correspond to the construction of an RDR table for the node, which may be done by implementing one or more of the processes 500, 600, 700, 800 and 900.

For example, the first mapping may be generated and updated based on applying the logic of various sub-systems, such as source mixing, relay mixing, etc. described above, to define relay assignments. Accordingly, the first mapping may indicate an expected time of relay of each first data packet of the set to neighbouring/peer nodes. Furthermore, when one or more of the sub-systems are employed for constructing the RDR table, generating the first mapping may include determining at least one of a first sub-mapping, which assigns any two data packets having a same source for relay to different subsets of the neighbouring nodes, and a second sub-mapping, which assigns different expected times of relay to any two data packets that are generated at the network node or received by the network node from the one or more first nodes in a same time interval.

In at least some implementations, the first mapping may depend on output interface capacities of the node. That is, the first mapping may be generated based, at least in part, on capacity constraints on output interfaces connecting the node to its one or more peers. Output interface capacity information may be combined with details (e.g., size, type, etc.) of the collected first data packets to generate and/or modify the relay assignments of the first mapping.

In operation 1006, a decorrelation metric value for the first mapping generated in operation 1004 is computed. The decorrelation metric value may represent, for example, a value associated with a decorrelation metric for the relay assignments defined by the first mapping. A decorrelation metric can be used to check that an algorithm used for generating and updating an RDR table efficiently mixes and assigns data packet relays to peers. In particular, a decorrelation metric can be useful for assessing how well an algorithm for assigning data relay to peers "de-correlates" the relayed data packets from their source(s). The decorrelation metric may, for example, be an indicator/measure of the level of anonymity which may be achievable by the assigned data relays specified by the first mapping. That is, the decorrelation metric may reflect the effectiveness of an algorithm in disassociating a relayed data packet from its origin/source.

In some implementations, the decorrelation metric value may be computed using Equation (1).

That is, the decorrelation metric value may represent entropy associated with the defined relay assignments of a mapping of data packets to relay nodes. In particular, given parameters R (total number of relays of the first data packets to peer nodes) and n (number of peer nodes), the decorrelation metric value may be obtained by computing:

$$S(R, n) = -\sum_{i=1}^{n} \frac{c_i}{R} \ln \frac{c_i}{R}$$

where the $c_i$'s represent number of first data packets that are assigned to the respective peer/neighbouring nodes by the first mapping. The $c_i$'s can be determined, for example, from a matrix representation of an RDR table ("M-RDR table") corresponding to the first mapping. In particular, the $c_i$'s are the numbers of non-zero entries in the columns of the M-RDR table. Other metrics appropriate for measuring anonymity performance of the first mapping, different from that computed using Equation (1), may be obtained.

In operation 1008, it is determined whether the computed decorrelation metric value S(R, n) for the first mapping satisfies a first condition. For example, the decorrelation metric value S(R, n) may be compared to a pre-defined numerical value (e.g., threshold value). In at least some implementations, the decorrelation metric value S(R, n) may be compared to a first pre-defined ("optimal") decorrelation metric value in order to gauge how close the two decorrelation metric values are. The first pre-defined decorrelation metric value may be associated with an assignment of data packets to relay nodes that is deemed to be "optimal". A difference between the decorrelation metric value S(R, n) and the first pre-defined decorrelation metric value may be computed, and the computed difference, $\Delta^{entr}$, may be compared to a threshold difference to determine how "close" the first mapping is to an "optimal" relay assignment. Specifically, the decorrelation metric value for the first mapping, S(R, n), may be determined to satisfy a first condition if the computed difference $\Delta^{entr}$ is less than or equal to a threshold difference, E.

There may be numerous different ways of defining an "optimal" relay assignment of data packets to peer nodes. One way to define such an "optimal" relay assignment is to minimize the number of data packets that are relayed to any single peer node, hence avoiding overlaps between senders of multiple different packets. That is, a relay assignment may be deemed to be "optimal" or close to optimal if the data packets are evenly distributed to the peer nodes for relay. For example, an optimal assignment may correspond to assigning $$c_i = \frac{R - R_n}{n}$$

data packets to the i-th column of an M-RDR table (i.e., i-th peer, i=1, ..., n) with $R_n$=R mod n. Multiple equivalent solutions for the optimal assignment may be found modulo permutation of indices.

For example, if R=23 and n=5, each column of the M-RDR table will receive $$c_i = \frac{R - R_n}{n} = 4$$

data packets. The remaining $R_n$ data packets may be distributed according to a predetermined algorithm. For example, the $R_n$ data packets may be distributed one for each of the leftmost columns of the M-RDR table until exhaustion. In general, the number of data packets assigned to peer $c_i$ may be expressed as:

$$c_i = \begin{cases} \frac{R - R_n}{n} + 1, & 1 \leq i \leq R_n \\ \frac{R - R_n}{n}, & \text{otherwise} \end{cases}$$

Based on this definition of an optimal assignment of n peers and R data packets to be relayed, a decorrelation metric value for the optimal relay assignment may be computed using Equation (1):

$$S^{op}(R, n) = -\frac{1}{R}\sum_{i=1}^{R_n}\left(\frac{R - R_n}{n} + 1\right)\ln\left[\frac{\frac{R-R_n}{n}+1}{R}\right] - \frac{1}{R}\sum_{i=R_n+1}^{n}\left(\frac{R - R_n}{n}\right)\ln\left[\frac{\frac{R-R_n}{n}}{R}\right] \quad (2)$$

Figures 15A, 15B, 15C:
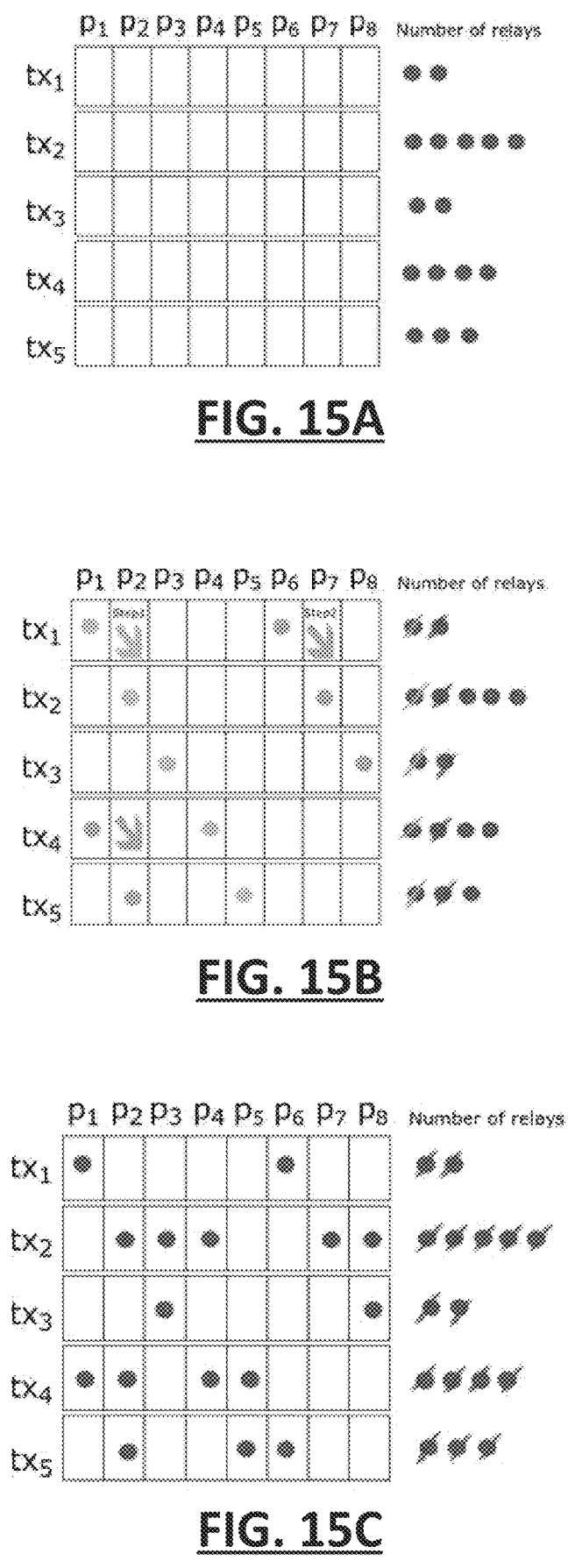

Another way to define an optimal relay assignment is illustrated in FIGS. 15A-C. In some implementations, an optimal assignment may be determined based on a given set of input parameters and certain constraints on the relays. For example, the set of inputs may include: number of data packets to be relayed, k; number of peer nodes, n; total number of transaction relays, R, and vector $r=(r_1, \ldots, r_k)$ containing the number of relays per data packet, $r_i = \Sigma_{j=1}^{n} \mu_{ij}$. The vector r may be determined, for example, when the first mapping of data packets to relay nodes is generated. That is, the number of relays per data packet as determined by the first mapping may serve as a constraint for the optimal relay assignment.

FIGS. 15A to 15C illustrate an algorithm, diagonal allocation algorithm (DAA), for building an M-RDR table that corresponds to an "optimal" relay assignment, given set inputs and constraints on number of relays per data packet. As shown in these figures, the data packets to be relayed to peers are allocated "diagonally". In FIG. 15A, an 5×8 M-RDR table is shown, with a total of R=16 relays to be allocated given the constraints on the number of relays per data packet, r=(2, 5, 2, 4, 3).

Once the M-RDR is initialized to an empty matrix, the algorithm starts allocating the data packet relays to peers and constructing an optimal M-RDR table. To avoid overlaps, the matrix is filled until all given data packets are allocated moving diagonally. Multiple equivalent optimal solutions may be built upon permutations of indices/peers.

In the first round, the algorithm updates the entries of the M-RDR table by setting $\mu_{ii}=1$ for i=1, ..., 5 and updating the vector r to r'=(1, 4, 1, 3, 2). The last non-zero entry added to the M-RDR table is $\mu_{55}$. In the second round, the data packets are allocated starting from column 6 in order to avoid overlaps. The entries $\mu_{16}, \mu_{27}, \mu_{38}, \mu_{41}, \mu_{52}$ are set to 1 and the vector containing the relays per data packet is updated to r=(0, 3, 0, 2, 1).

The algorithm continues to fill the M-RDR table until exhaustion of relays to allocate as shown in FIG. 15C. More generally, the main steps of the DAA may be defined as follows:

1. Define input parameters, $\xi=(k, n, r, R)$
2. Initialize k×n matrix, $M^{opt}$
3. Begin filling the $M^{opt}$ diagonally, starting from the main diagonal
4. Update the vector r→r'
5. Select new diagonal to allocate data packets for relay. If n>k, update $\mu_{i,(k+i) mod\ n}=1$ for i=1, ..., n
6. Update the vector r'→r''
7. Iterate until r=(0, ..., 0).

Once the optimal M-RDR, $M^{opt}$, has been generated via the DAA, the entries of the $M^{opt}$ allow for computing probabilities $$\pi_i = \frac{c_i}{R},$$

that are in turn used to compute the decorrelation metric for the optimal M-RDR table, $S^{op}$ (R, n).

Whether the first pre-defined decorrelation metric value is computed using Equation (2) or based on the DAA, in operation 1008, the node computes the difference between the decorrelation metric value for the first mapping S(R, n) and $S^{op}$(R, n), and compares the computed difference to a predetermined threshold value.

If the decorrelation metric value S(R, n) does not satisfy the first condition (e.g., the computed difference is greater than a threshold value), a second mapping of the first data packets to neighbouring nodes is generated in operation 1010, where the second mapping defines relay assignments that are different from those of the first mapping. That is, once it is determined that the first mapping is not sufficiently "close" to a defined optimal relay assignment, a second different mapping of data packets to peers is generated.

In some implementations, generating the second mapping may include modifying the choice of peers for the relay of each of one or more of the first data packets. In particular, for at least one of the collected first data packets, a second set of neighbouring nodes that is different from a set of neighbouring nodes that the at least one first data packet is assigned to by the first mapping may be selected, and the at least one first data packet can be assigned to the selected second set of neighbouring nodes. In this way, the number of relays per data packet may be fixed and only the choice of peers to relay a data packet to may be altered.

In operation 1012, a decorrelation metric value for the second mapping $S_2$(R, n) is computed, using the techniques described above. Similar to operation 1008, the decorrelation metric value $S_2$ (R, n) may be compared to the decorrelation metric value $S^{op}$ (R, n) for an optimal relay assignment to determine whether $S_2$ (R, n) satisfies the first condition (i.e., the computed difference, $\Delta^{entr}=|S_2(R,n)-S^{op}(R,n)|\geq\epsilon$).

In this way, a "feedback loop" may be defined for iteratively generating mappings/relay assignments and evaluating associated decorrelation metric values until obtaining a mapping/relay assignment that satisfies a pre-determined condition, such as, for example, proximity to an optimal relay assignment. In some cases, to avoid excessive delay in RDR table generation and data relay, a maximum number of iterations of the feedback loop may be pre-defined. Such maximum number of iterations may be defined locally (per node) or globally (entire network).

Accordingly, in at least some implementations, a count of iterations of generating new mappings of the first data packets of the collected set for relay to the one or more peers of a node may be maintained (e.g., stored in a database). Furthermore, a current decorrelation metric value associated with a lowest computed difference from the first decorrelation metric value to date and a current mapping/relay assignments that is associated with the current decorrelation metric value may also be stored. The node may then determine if the count of iterations has reached a predefined maximum number and if so, transmit the first data packets of the collected set according to the current mapping, i.e., without performing further iterations of the feedback loop.

In operation 1016, once a mapping that satisfies the first condition is obtained, the first data packets are transmitted by the node to its neighbouring/peer nodes according to the obtained mapping. In at least some implementations, the transmission of the first data packets to peers may be done concurrently or nearly concurrently.

Figure 14:
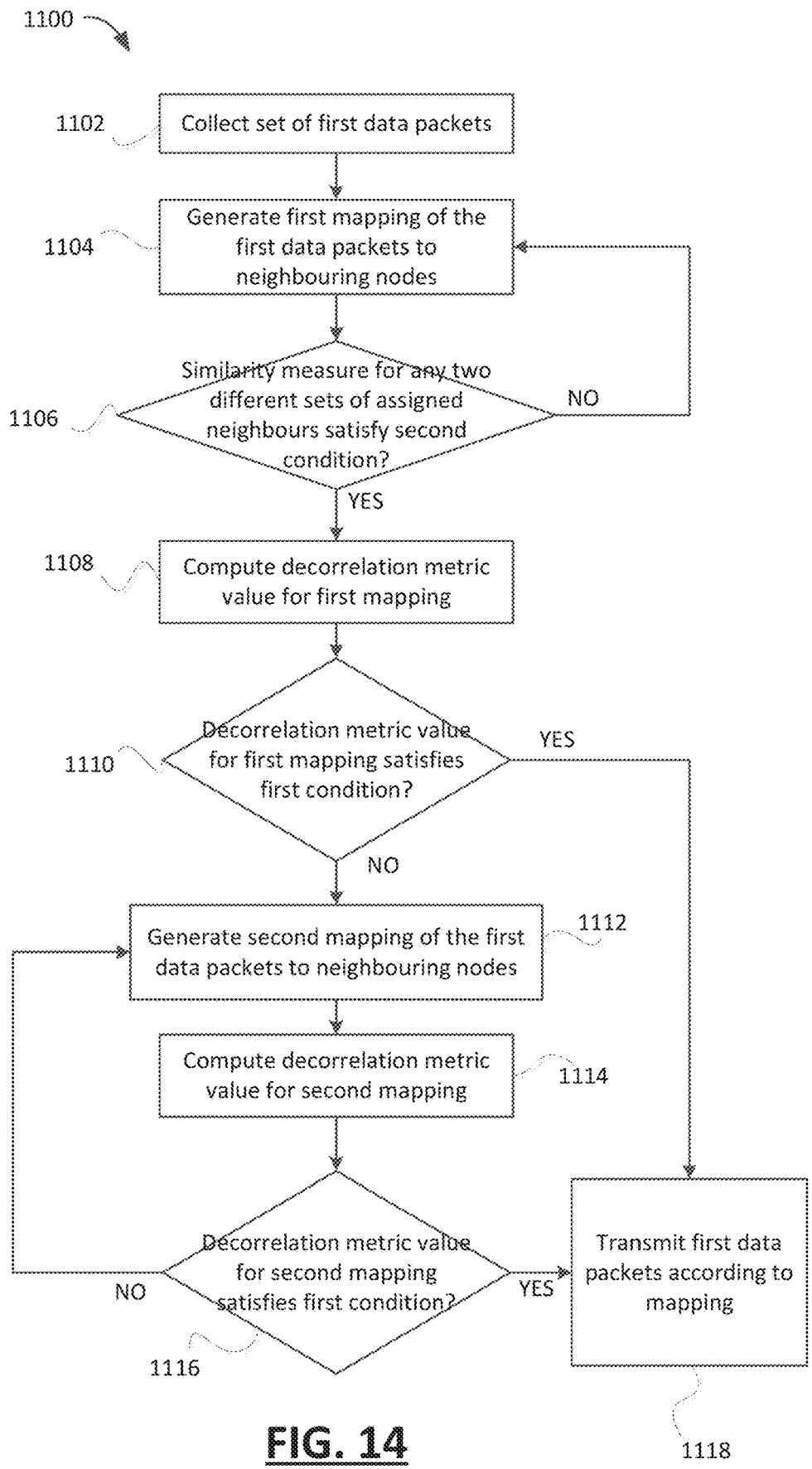
FIG. 14 shows, in flowchart form, another example process for relaying data packets to peer nodes.

Reference is now made to FIG. 14, which shows, in flowchart form, another example process 1100 for relaying data packets to peer nodes. The process 1100 is implemented by a node of, for example, a blockchain network, such as network 100.

The operations 1102, 1104 and 1108-1118 correspond to operations 1002, 1004 and 1006-1016 of process 1000, respectively. The process 1100 includes an additional operation 1106 for conducting real-time checks during the creation of an RDR table at the sub-systems level. Specifically, in operation 1106, the node obtains, for any two different first data packets of the collected set, a measure of similarity between the sets of neighbours to which said first data packets are respectively assigned by the first mapping. The operation 1106 allows for measuring the similarity of the sets of peers to which different data packets are assigned. As explained above, it is desirable that two different data packets are relayed to different sets of peers, i.e., sets of relay nodes for different data packets are disjoint.

One example measure of similarity is cosine similarity. Given two vectors A and B having the same dimensions, the cosine similarity s is given by $$s = \frac{\sum_{i=1}^{n} A_i B_i}{\sqrt{\sum_{i=1}^{n} A_i^2} \sqrt{\sum_{i=1}^{n} B_i^2}}$$

This quantity can take values in the interval $[-1, 1]$. Values sufficiently close or equal to 1 will imply strong correlations between the vectors A and B, s=0 indicates that the two vectors are completely de-correlated, and s=−1 indicates that the two vectors are opposite.

A row of an M-RDR table corresponds to the set of neighbour nodes that are selected for relay of a data packet. In particular, a row can be represented as a vector, where each non-zero entry of a row of the M-RDR table is shown as a non-zero entry in the corresponding vector form. The cosine similarity between any two different rows of an M-RDR table can thus be computed, based on the vector representations of the rows (i.e., sets of neighbours for relay). The cosine similarity may be used to get an estimate on how different the relays of the data packets are. For example, if the cosine similarity for two rows/vectors is close to s=1, it may signal that the relays do not vary sufficiently, and that the node should reset the parameters of one or more of the sub-systems during the RDR generation stage. This measurement can be taken in real-time while constructing the RDR table to improve the performances of the relays. The measure of similarity may, in some implementations, be obtained prior to computing the decorrelation metric value for the first mapping, i.e., obtained during or immediately after generation of the first mapping.

Thus, in response to determining that the measure of similarity satisfies a second condition (e.g., s=1, or at least falls outside of a predetermined range of values), a third mapping (different from the first mapping) of the first data packets of the set to the one or more neighbouring nodes may be generated.

Figure 16:
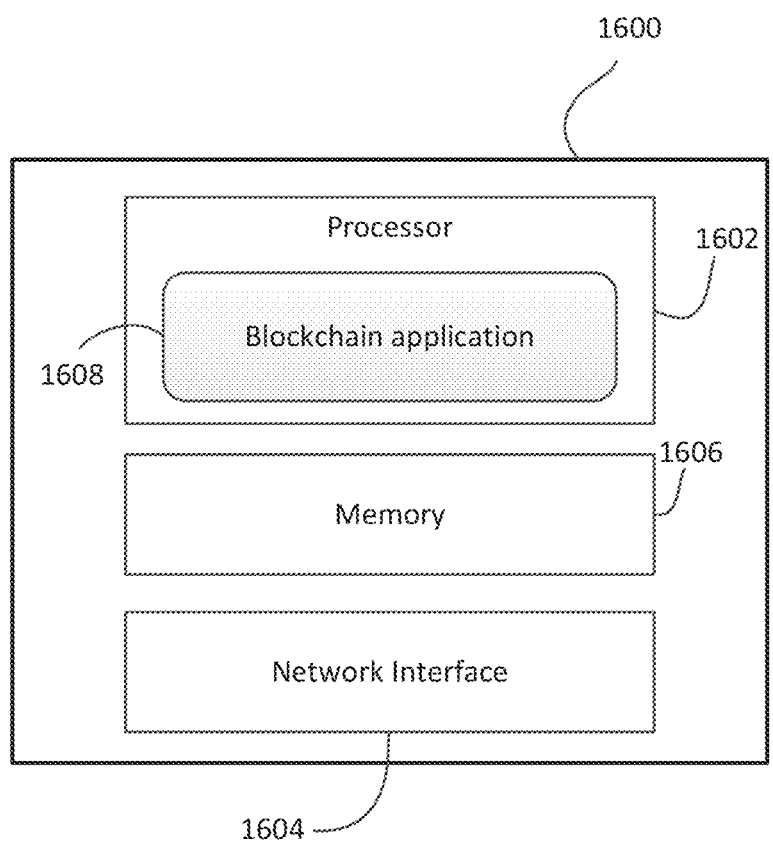
FIG. 16 shows, in block diagram form, an example blockchain node.

Reference will now be made to FIG. 16, which shows, in block diagram form, a simplified example of a participating node 1600. The node 1600 includes a processor 1602, which may include one or more microprocessors, application specific integrated chips (ASICs), microcontrollers, or similar computer processing devices. The node 1600 further includes memory 1604, which may include persistent and non-persistent memory, to store values, variables, and in some instances processor-executable program instructions, and a network interface 1606 to provide network connectivity over wired or wireless networks.

The node 1600 includes a processor-executable blockchain application 1608 containing processor-executable instructions that, when executed, cause the processor 1602 to carry out one or more of the functions or operations described herein.

It will be understood that the devices and processes described herein and any module, routine, process, thread, application, or other software component implementing the described method/process for configuring the blockchain node may be realized using standard computer programming techniques and languages. The present application is not limited to particular processors, computer languages, computer programming conventions, data structures, or other such implementation details.

It should be noted that the above-mentioned implementations illustrate rather than limit the invention, and that those skilled in the art will be capable of designing many alternative implementations without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

What is claimed is:

1. A computer-implemented method performed at a first node in a network of nodes for propagating data packets in the network of nodes, and the network of nodes comprises a plurality of one or more first entry nodes, the method comprising:
    generating at least one data packet of a first type;
    collecting a set of first data packets of the first type during a first time period, T, the set including at least one data packet received from one or more other nodes in the network;
    arbitrarily selecting a first subset of entry nodes to the first node to which a subset of the collected and generated data packets will be forwarded to;
    transmitting the subset of collected and generated data packets to the subset of arbitrarily selected entry nodes;
    receiving, by the first subset of entry nodes, the data packets from the first node;
    relaying the data packets to a second subset of entry nodes using a mode of propagation that is randomly selected for each second entry node;
    building a routing data structure that defines an allocation scheme for each node that adopts a random differential relay protocol, and
    using the routing data structure to manage which transactions are directed to which node of the network and at what time.

2. The method of claim 1, wherein the data packet of the first type comprises a blockchain transaction.

3. The method of claim 1, wherein the length of time period T is predefined and varies based on parameters including one of: average connection time, average number of transactions received per unit of time, or a number of incoming connections to the node within the network.

4. The method of claim 1, wherein during the time period, T, the first node is only permitted to accumulate data packets of the first type, and is prevented from transmitting any data packets of the first type for the duration of time period T.

5. The method of claim 1, further comprising:
    querying the network to obtain fresh addresses of its peers, wherein the first node queries one or more database source names (DSN) embedded in Bitcoin Core, BitcoinJ, or other blockchain protocol, and maintained by Bitcoin community members; and
    as a response, receiving at the first node, one or more DSN records showing the IP addresses of available full nodes which may accept incoming connections.

6. The method of claim 1, wherein the mode of propagation comprises either a standard diffusion process or a random differential relay process.

7. The method of claim 6, wherein a higher predefined probability of being selected as the mode of propagation is associated with the random differential relay mode compared to the standard diffusion process.

8. The method of claim 1, wherein selecting the mode of propagation comprises:
    receiving, by the first subset of entry nodes, a message from the first node;
    generating, a random value, appending the random value to the message, and hashing the result; and
    checking the hash value and obtaining the mode of propagation based on predetermined rules regarding the hash value of the result.

9. The method of claim 1, wherein selecting the mode of propagation comprises a randomized process where the probability of selecting one of the modes is greater than that of selecting the other of the modes.

10. A computer-implemented system comprising a network of a plurality of nodes, each of the nodes comprising a processor and a memory, the memory comprising instructions that, in response to execution by the processor, cause the system to at least:
    generate at least one data packet of a first type at a first node;
    collect a set of first data packets of the first type during a first time period, T, the set including at least one data packet received from one or more other nodes in the network;
    arbitrarily select a first subset of entry nodes to the first node to which a subset of the collected and generated data packets will be forwarded to;
    transmit the subset of collected and generated data packets to the subset of arbitrarily selected entry nodes;
    receive, at the first subset of entry nodes, the data packets from the first node;
    relay the data packets to a second subset of entry nodes using a mode of propagation that is randomly selected for each second entry node;
    build a routing data structure that defines an allocation scheme for each node that adopts a random differential relay protocol, and use the routing data structure to manage which transactions are directed to which node of the network and at what time.

11. A non-transitory computer-readable medium storing instructions thereon that, as a result of execution by a processor of a computer system, cause the computer system to at least:

generate at least one data packet of a first type at a first node of a network;

collect a set of first data packets of the first type during a first time period, T, the set including at least one data packet received from one or more other nodes in the network;

arbitrarily select a first subset of entry nodes to the first node to which a subset of the collected and generated data packets will be forwarded to;

transmit the subset of collected and generated data packets to the subset of arbitrarily selected entry nodes;

receive, at the first subset of entry nodes, the data packets from the first node;

relay the data packets to a second subset of entry nodes using a mode of propagation that is randomly selected for each second entry node;

build a routing data structure that defines an allocation scheme for each node that adopts a random differential relay protocol, and use the routing data structure to manage which transactions are directed to which node of the network and at what time.

* * * * *